(12) United States Patent
Aguera-Arcas et al.

(10) Patent No.: US 9,606,643 B2
(45) Date of Patent: Mar. 28, 2017

(54) EXTENDED ABOVE THE LOCK-SCREEN EXPERIENCE

(75) Inventors: Blaise Hilary Aguera-Arcas, Seattle, WA (US); George Eric Engstrom, Kirkland, WA (US); John Steven Strauch, Seattle, WA (US); Bernard Kerr, San Francisco, CA (US); Scott Fynn, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 13/171,784

(22) Filed: Jun. 29, 2011

(65) Prior Publication Data

US 2012/0284297 A1 Nov. 8, 2012

Related U.S. Application Data

(60) Provisional application No. 61/481,486, filed on May 2, 2011.

(51) Int. Cl.
G06F 9/24 (2006.01)
G06F 3/0354 (2013.01)
G06F 21/62 (2013.01)

(52) U.S. Cl.
CPC ........ G06F 3/03547 (2013.01); G06F 21/629 (2013.01)

(58) Field of Classification Search
CPC .................................................. G06F 3/03547
USPC ....................................................... 715/864
See application file for complete search history.

(56) References Cited

U.S. PATENT DOCUMENTS

| 5,581,682 A * | 12/1996 | Anderson ............. G06F 17/241 |
| | | 715/236 |
| 8,136,053 B1 * | 3/2012 | Miller et al. .................. 715/863 |
| 8,219,931 B2 * | 7/2012 | Hsieh et al. .................. 715/835 |
| 8,255,810 B2 * | 8/2012 | Moore et al. ................. 715/752 |
| 8,341,557 B2 * | 12/2012 | Pisula et al. ................. 715/863 |
| 2006/0075228 A1 * | 4/2006 | Black ................. H04L 63/0428 |
| | | 713/167 |
| 2007/0016958 A1 * | 1/2007 | Bodepudi et al. ............... 726/27 |
| 2007/0198485 A1 * | 8/2007 | Ramer et al. ..................... 707/3 |
| 2009/0241040 A1 | 9/2009 | Mattila et al. |
| 2010/0001967 A1 | 1/2010 | Yoo |
| 2010/0146384 A1 | 6/2010 | Peev et al. |
| 2010/0159995 A1 | 6/2010 | Stallings et al. |
| 2010/0306705 A1 | 12/2010 | Nilsson |
| 2011/0076981 A1 | 3/2011 | Singh et al. |
| 2011/0265177 A1 * | 10/2011 | Sokolan et al. ................ 726/19 |

(Continued)

OTHER PUBLICATIONS

The SmartScreen SDK as described on Media-phone.com as of Apr. 28, 2010 (SmartScreen).*

(Continued)

*Primary Examiner* — William Bashore
*Assistant Examiner* — Nathan Shrewsbury
(74) *Attorney, Agent, or Firm* — Shook, Hardy & Bacon L.L.P.

(57) ABSTRACT

A subset of functionality associated with an application or portion of an application can be executed above a lock screen. A lock screen enables a device to transition from a locked state to an unlocked state. While in a locked state, at least a subset of application functionality can be deployed. Additional functionality associated with the application can be accessed by transitioning to an unlocked state.

22 Claims, 26 Drawing Sheets

(56) References Cited

U.S. PATENT DOCUMENTS

2012/0036556 A1* 2/2012 LeBeau et al. .................. 726/3
2012/0124644 A1* 5/2012 LeBeau et al. .................. 726/3

OTHER PUBLICATIONS

Want to put widgets in your lockscreen? Get Widget Locker by Andrew Kameka Jul. 16, 2010 Andoinica.com (WidgetLocker).*
A Hands-On Tour: Google Goggles Visual Search by JR Raphael PCWorld Dec. 7, 2009 (Google Goggles).*
Password protected hyper link by Jason Bunting Oct. 30, 2008 Stack Overflow (Bunting).*
"International Search Report", Mailed Date: Nov. 30, 2012, Application No. PCT/US2012/036194, Filed Date: May 2, 2012, pp. 9.
Li, Yang, "Gesture Search: A Tool for Fast Mobile Data Access", Retrieved at <<http://static.googleusercontent.com/external_content/untrusted_dlcp/www.google.com/en//research/pubs/archive/36911.pdf>>, Proceedings of the 23nd annual ACM symposium on User interface software and technology, Oct. 3-6, 2010, pp. 87-96.
Arias, et al., "Context Based Personalization for Mobile Web Search", Retrieved at <<http://citeseerx.ist.psu.edu/viewdoc/download?doi=10.1.1.144.3749&rep=rep1&type=pdf>>, VLDB Endowment, Aug. 24-30, 2008, pp. 7.
"Ranting and Dreaming", Retrieved at <<http://setiabud.blogspot.com/2010/11/windows-phone-7-experience.html>>, Retrieved Date: Apr. 26, 2011, pp. 4.
Nudelman, Greg, "Immersive Mobile E-Commerce Search Using Drop-Down Menus", Retrieved at <<http://www.uxmag.com/design/immersive-mobile-e-commerce-search-using-drop-down-menus>>, Feb. 2, 2011, pp. 6.
Baxi, Abhishek, "I Love Windows Phone!", Retrieved at <<http://ilovewindowsphone.in/whitepaper-windows-mobile-6-5-user-experience/>>, Retrieved Date: Apr. 26, 2011, pp. 8.
"Nokia Bubbles", Retrieved at <<http://betalabs.nokia.com/apps/nokia-bubbles>>, Retrieved Date: Jun. 17, 2011, pp. 2.

* cited by examiner

EXTENDED ABOVE THE LOCK-SCREEN EXPERIENCE

CROSS-REFERENCE TO RELATED APPLICATIONS

This application claims the benefit of U.S. Provisional Patent Application No. 61/481,486, filed May 2, 2011, and entitled "EXTENDED ABOVE THE LOCK-SCREEN EXPERIENCE." The entirety of the aforementioned application is incorporated herein by reference.

BACKGROUND

A lock screen is often employed with respect to computers to prevent undesired interaction. A lock screen is a unique display-screen of a user interface that when active generally limits interaction with a computer, including the ability to execute applications and access data. Accordingly, a user can lock a computer or the computer can lock itself after a period of inactivity, which results in presentation of the lock screen and substantially limited computer interaction. Subsequently, the user can perform one or more particular actions to unlock the computer, thus removing the lock screen and enabling full interaction.

Protection is provided by a lock screen with respect to interaction by unauthorized as well as authorized users. For example, a lock screen can require entry of a password to unlock the computer thereby preventing unauthorized users from accessing computer functionality and personal data. In another instance, a lock screen can prevent unintended computer interaction by an authorized user, which is especially useful with respect to small computers such as mobile phones. One example of unintended interaction, often referred to as pocket dialing, occurs when a mobile phone is accidentally touched or bumped and, unbeknownst to the user, initiates a call from within the a user's pocket or purse. In this instance, rather than, or in addition to a password, a particular gesture can be employed to unlock the computer such as a horizontal swipe of a finger across the screen or pressing a physical or virtual button.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to an extended above the lock screen experience. More particularly, at least a subset of functionality associated with one or more applications or portions thereof can be employed above a lock screen. By way of example and not limitation, a subset of web search functionality can be employed above a lock screen to enable expeditious access to search functionality as well as content. Further, the lock screen can be transcended to enable application execution below the lock screen, for example to access functionality not available above the lock screen (e.g., access a selected search result). Still further, content generation can be deployed above a lock screen in which content based on context is automatically delivered above the lock screen. For instance, a traffic accident notification can be rendered above the lock based on gathered location data from the device or computer.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
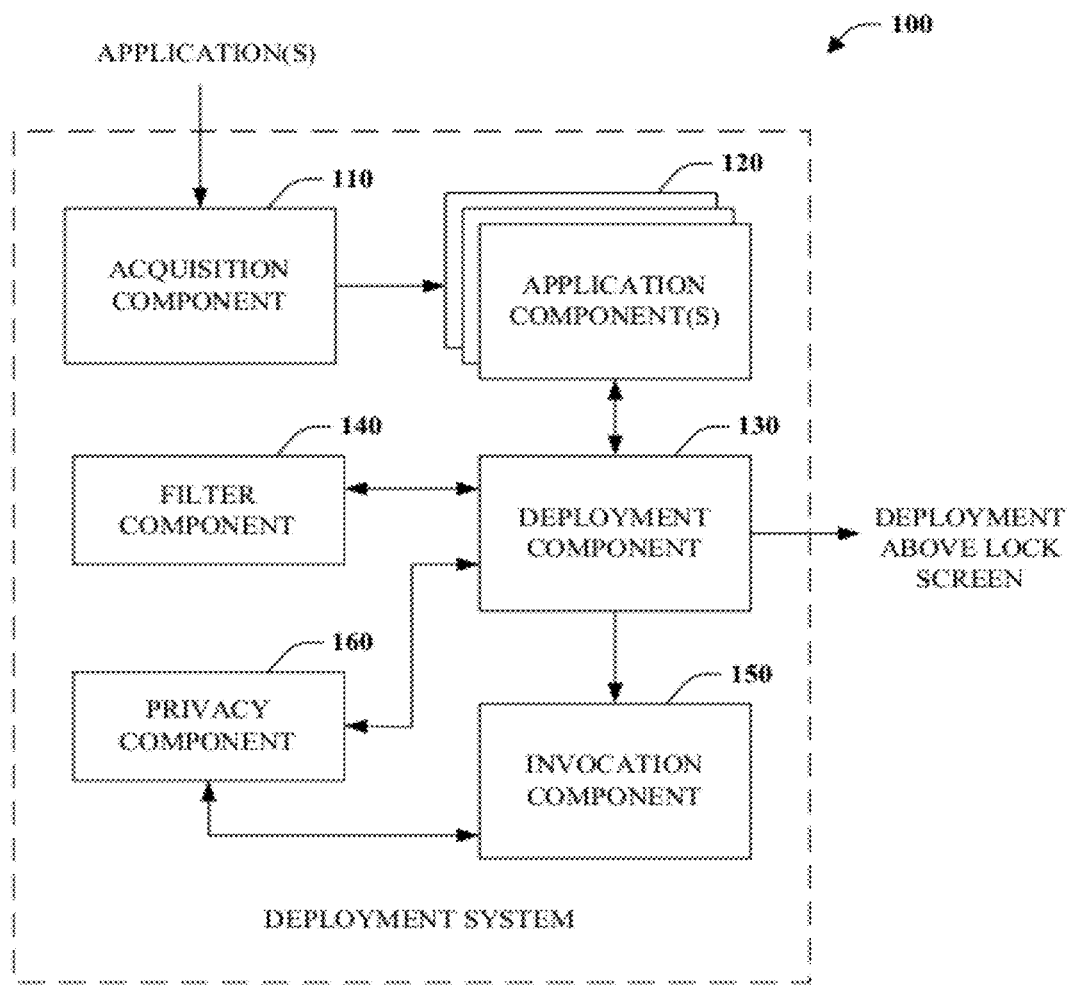
FIG. 1 is a block diagram of a system that facilitates deployment of applications above a lock screen.

Details below are generally directed toward an extended lock screen experience. For recurrent or time sensitive tasks or frequently updating data, unlocking a computer, locating and launching an application and invoking functionality can be a noticeable hindrance (e.g., numerous distinct user interactions). Further, users are often unaware of particular tools or application functionality that would be useful in a specific situation. Additionally, users typically do not have timely access to useful information at a moment of need. These issues can be addressed by providing applications and content above a lock screen. This allows a user to have fast access to, and discoverability of, one or more applications and/or functionality, as well as relevant content. By way of example and not limitation, a user can pull a mobile device out of a pocket or purse and be provided with substantially instance access to search tools as well as contextually relevant information such as a map of the user's current location located on the display associated with the device lock screen. Of course, for privacy conscious users, the type and amount of information exposed on the lock screen can be controlled. Additionally, the user can be provided with substantially instant access to at least subset of functionality associated with any application.

Provided below are details regarding systems and methods for provisioning access to applications and information above a lock screen. For purposes of simplicity and brevity various aspects of the disclosed subject matter are described and depicted with respect to a search application, search tools, and associated functionality. However, the claimed subject matter is not intended to be limited thereto as a number of other applications and related functionality can be accessed and utilized is a similar manner.

Herein, "above the lock" or "above a lock" refers to actions performed while a computer is in a locked state, and "below the lock" or "below a lock" is intended to refer to actions performed when a computer is in an unlocked state, wherein actions can refer to initiating execution of computer executable code, as well as input and output of data, among other things. Typically, a computer employs a lock screen in order to prevent unintentional execution of processes or applications. In the locked state, a computer typically limits actions to those needed to transition to an unlocked state where most actions are performed. However, as described herein, at least a subset of such actions can be performed above the lock. Stated differently, a subset of functionality is deployed while in the locked state—contrary to conventional mechanisms that solely allow transitioning from such locked state. Further, since a lock screen typically indicates whether a device is in a locked or unlocked state, often the terms "above the lock screen" or "above a lock screen" and "below the lock screen" or "below a lock screen" are used for clarity. Further yet and as will be described in more detail hereinafter, data, information, content, or the like can be rendered on a conventional lock screen and/or a different screen that also resides above a lock.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a deployment system 100 is illustrated that facilitates deployment of software applications or portions thereof above a lock screen. The deployment system 100 can be configured to execute a subset of application functionality above a lock screen for a computer or device. The deployment system 100 can permit at least a portion of applications to execute a subset of functionality while the computer or device is in a locked state. Stated differently, a portion of an application can be deployed on a computer and executed above the lock screen, whereas in conventional techniques only a transition from a locked state to an unlock state is permitted.

As discussed, a lock screen is an idle state in which a device or computer functionality is limited solely to a transition out of such lock screen. For example, a mobile device will transition into a lock screen or locked state after a period of inactivity or an input from a user (e.g., pressing a hardware button). Overall, the lock screen is used to secure the device or computer. In one instance, the security is to protect from unintentional or accidental activity on the device or computer. Additionally, the lock screen may require authentication (e.g., password, code, etc.) to prevent unauthorized access to the device or computer. Although the lock screen affords security, it often hinders quick access to applications and data since multiple steps are required to transition from a locked state to an unlocked state and then from a home screen (e.g., application listing) to an application. By enabling at least a subset of functionality of an application to deploy above the lock screen, accessibility can be optimized without compromising security. For example, in addition to a rendering a "slide to unlock" on a lock screen, a "slide to search" can concurrently be rendered to allow a search to be performed (e.g., rendered above the lock and executing the search above the lock).

Continuing with FIG. 1, the deployment system 100 further includes an acquisition component 110 configured to receive, retrieve, or otherwise obtain or acquire one more applications (e.g., sets of instructions, program modules, data, updates, etc. specified in a computer programming language that when executed by a computer performs functionality described thereby), portions thereof, and/or metadata represented by one or more application components 120. Such application components 120 are capable of providing various functions including but not limited to searching, social networking, content delivery, and the like. In general, the acquisition component 110 can obtain a portion of any application that corresponds to a subset of functionality in which such subset of functionality can be deployed above the lock screen.

The deployment system 100 can further include a deployment component 130 that is configured to deploy the one or more application components 120 above a lock screen. Stated differently, an application can be deployed on a conventional lock screen or other screen while a device is in a locked state, as opposed to below the lock screen where applications typically operate after a device is unlocked. It is to be appreciated that "deploy" can include any installation, setup, configuration, re-configuration, etc. of a portion of an application. In other words, a portion of an application that is deployed can include installation of the portion of the application and/or configuration of the portion of the application. Furthermore, the deployment component 130 can deploy a select application such that a selection is a choice of a plurality of applications. For example, a conventional application can be stored or resident on a computer that executes below a lock screen (e.g., while in an unlocked state). Yet, the deployment system 100 allows a select application (e.g., stored on a computer, obtained from a remote source, etc.) to be deployed while the computer is in a locked state. As will be described later, operating above the lock screen (e.g., while in a locked state) may require a particular gesture to expose one or more of the application components 120. It is to be appreciated that the particular gesture can be in addition to a typical gesture employed to transition from a locked state (e.g., above a lock screen) to an unlocked state (e.g., below a lock screen).

The deployment system 100 further includes a filter component 140 that is configured to enable filtering or constraint of the number of applications and/or amount of information that is delivered above the lock screen. Conventionally, the lock screen is solely utilized as means of transitioning a computer from a locked state of limited functionality (e.g., related to unlocking the computer) to an unlocked state. Moreover, the addition of more than a small number of applications and/or content can reduce the provided benefit and resemble more of a home screen (a.k.a. idle screen or main screen), which provides a starting point for access to computer functionality. In accordance with one aspect, applications and/or content can be filtered as a function of contextual information including user location, interests, preferences, etc.

Furthermore, the filter component 140 can manage the application components 120 exposure above the lock screen. In general, the filter component 140 can control an amount of data rendered above the lock screen in order to maintain a streamlined and uncluttered experience above the lock. For example, the filter component 140 can include default settings or user-defined settings in which application components 120 deployed above the lock are managed. In terms of a default setting, the filter component 140 can manage the application components 120 that are deployed above the lock screen based on a number (e.g., restrict to two (2) application components to be deployed above lock screen at any time). In another example, the filter component 140 can manage above the application components 120 based upon application type (e.g., allow one (1) search application, allow one (1) social network application, etc.). In terms of a user-defined setting, the deployment of application components 120 (and respective subset of functionality) can be specifically tailored.

The deployment system 100 can further include an invocation component 150 that is configured to invoke execution of a particular application below the lock screen, for example to employ full device and application functionality. In general, the transition between above a lock screen to below a lock screen can include authentication, such as, but not limited to a password entry. Various content and user interaction is enabled above a lock screen by a way of the deployment system 100, yet the invocation component 150 can afford a transition to an unlocked state in order to access additional functionality associated with the application components 120. For instance, if a search engine is employed above the lock screen, navigation to returned results may require execution of the search engine application below the lock screen and possibly an authentication to transition below the lock screen.

The deployment system 100 can further include a privacy component 160 that is configured to manage data exposure for application components 120 that are deployed above the lock screen. In general, data can be exposed for application components 120 when executed above the lock screen, wherein the data exposure can correspond to the subsets of functionality provided by the application components 120. In a particular embodiment, the privacy component 160 can ensure that deployed portions of the application above the lock screen satisfy a certain privacy policy. For instance, the privacy policy can be user-defined or customized from a default setting. In still another embodiment, the privacy component 160 can employ an anonymous filter that strips (e.g., removes) data of any personal or private information so as to ensure the data exposure will be anonymous.

In another embodiment, the privacy component 160 can monitor the deployed application components 120, and in particular, data exposed during the employment of any subset of application functionality that occurs above the lock screen. Based on this monitoring, the privacy component 160 can trigger the invocation component 150 for authentication. In general, if a particular data exposure or privacy level is exceeded the invocation component 150 can require an authentication for further execution of the subset of application functionality. Stated differently, once a subset of application functionality is deemed to exceed a privacy threshold, an authentication can be required to continue such application functionality below the lock screen.

It is to be appreciated that the privacy component 160 can include settings that are user-defined in order to customize what each individual user considers private (e.g., unacceptable) or public (e.g., acceptable) data exposure. In terms of a query application example, a query can be received and results can be provided. Yet, further access to a selected search result can be deemed above a data exposure threshold which will invoke an authentication to continue below the lock screen. Additionally, the privacy component 160 can include default settings in which particular subsets of application functionality will invoke an authentication. It is to be appreciated that the invocation component 150 can include any suitable authentication techniques such as, but not limited to, a password entry, a personal identification number (PIN) entry, a thumbprint, facial recognition, retina detection, secret question answer, biometric data, among others.

It is to be appreciated that the deployment system 100 can be employed with any "computer," defined herein to include a computing device, mobile device, handset, mobile phone, laptop, portable gaming device, tablet, smart phone, portable digital assistant (PDA), gaming console, web browsing device, portable media device, portable global positioning assistant (GPS) devices, electronic reader devices (e.g., e-readers), touch screen televisions, touch screen displays, tablet phones, any computing device that includes a lock screen, and the like.

For example, a laptop can include the deployment system 100. The laptop can include a screen saver in which the laptop is in a locked state. The deployment system 100 can deploy a subset of functionality for an application to execute above a lock screen. Following the example, a screen saver (e.g., lock screen) can include a deployed application that includes a subset of functionality. In a particular example, search functionality can be exposed above the lock screen (here, the screen saver).

Further, a mobile device can acquire a search application from an application store, wherein the search application includes above the lock screen functionality. For instance, the search application can be an update to an existing search application installed on the mobile device. The search application can be deployed on the mobile device such that a subset of functionality is executed while in a locked state of the mobile device. Stated differently, the mobile device locked state is extended to include execution of the search application, whereas conventional mobile devices in a locked state are solely limited to an unlocking functionality.

Figure 2:
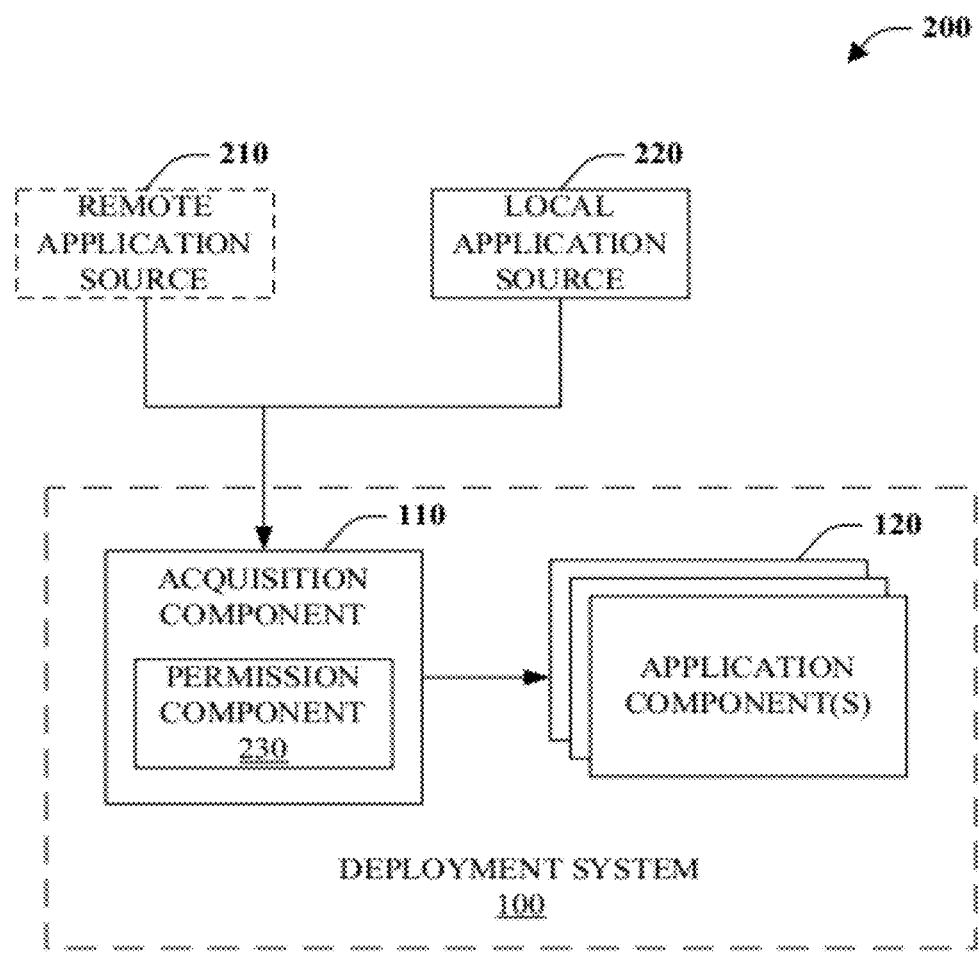
FIG. 2 is a block diagram of an application delivery system that extends a portion of an application above a lock screen.

FIG. 2 illustrates an application delivery system 200 that extends a portion of an application above a lock screen. The system 200 is a representation of the acquisition component 110 and the application components 120 of the deployment system 100 in further detail. The system 200 can facilitate exposing a subset of functionality related to an application above a lock screen (e.g., while in a locked state). In particular, the acquisition component 110 receives, retrieves, aggregates, requests, etc. a portion of application components 120. In general, it is to be appreciated and understood that the acquisition component 110 can acquire a portion of the application component 120 from at least one of a remote application source 210 or a local application source 220 (collectively referred to as "sources").

The remote application source 210 can include an application store, an external memory (e.g., SD card, flash drive, etc.), a website, a download from the Internet, a cloud, a server, among others. For instance, the acquisition component 110 can receive a portion of an application component 120 via a cellular or wireless data communication from a cloud-based application platform. As discussed, it is to be appreciated that the remote application source 210 can be any source (e.g., website, web link, memory, hard drive, server, etc.) external or remote to the deployment system 100.

The local application source 220 can include any installed, existing, or locally retrieved applications. Such local applications can be utilized by the acquisition component 110 as application components 120 and, in turn, deployed above the lock screen. Stated differently, existing applications on a host (e.g., computer, device, etc.) can be utilized by the acquisition component 110 for conversion to an application component 120 for deployment above a lock screen.

The remote application source 210 and/or the local application source 220 can include applications in any suitable format. In particular, the applications associated with the sources can be updates of existing applications, wherein the update enables an above the lock screen functionality. In another example, the applications from the sources can be specifically tailored applications that are to be deployed above the lock screen. In still another example, the sources can include applications that do not incorporate above the lock screen functionality, yet the system 200 exposes such functionality by acquiring portions of the application (via the acquisition component 110).

For example, a mobile device can include a social network application that executes below the lock screen. The acquisition component 110 can collect portions of the social network application as application components 120, to which the deployment component 130 (not shown) enables above the lock execution of a subset of functionality associated with the social network application. It is to be appreciated that the social network application can be stored on the mobile device (e.g., executable for installation, *.exe, installation package, etc.), installed on the device, among others. In a similar example, the mobile device can download (from a remote source) an update to a social network application that includes above the lock screen functionality. Moreover, the mobile device can acquire an application solely for the execution above the lock (e.g., above the lock version of the application versus a conventional below the lock version of the application).

In one embodiment, the acquisition component 110 can collect, retrieve, receive, or obtain metadata or a portion of data that can include permission information to enable an application or portion thereof deploy and execute above a lock screen (e.g., while in a locked state). The metadata or portion of data acquired by the acquisition component 110 can include permissions or requisite portions of code (e.g., set of instructions) for execution of an application or portion thereof while in a locked state.

The acquisition component 110 can further include a permission component 230 that is configured to grant permission to application components 120 with a device or computer. The permission component 230 affords a mechanism in order to permit application components 120 to deploy above the lock screen and, in turn, implement a subset of functionality of the application components 120 above the lock screen (e.g., while in a locked state). Conventional techniques can restrict computer resources and applications with the exception of a lock screen mechanism that transitions from a locked state to an unlocked state. For instance, a computer can include a subset of instructions related to an operating system in which particular functionalities are restricted and not accessible. However, the permission component 230 can communicate with the computer to grant access to application components 120 for the deployment of a subset of functionality (associated with the application components 120) while the computer is in a locked state (e.g., above the lock screen). For instance, a mobile device can include areas of an operating system that are partially closed and restricted, wherein access to such areas often require a "hack" or a "jailbreak." Yet, the permission component 230 affords a less intrusive manner to access such areas of an operating system for permitting an application for deployment while in locked state. For example, the permission component 230 can access a system registry, an application manager, file system, file registry, application registry, and the like.

Figure 3:
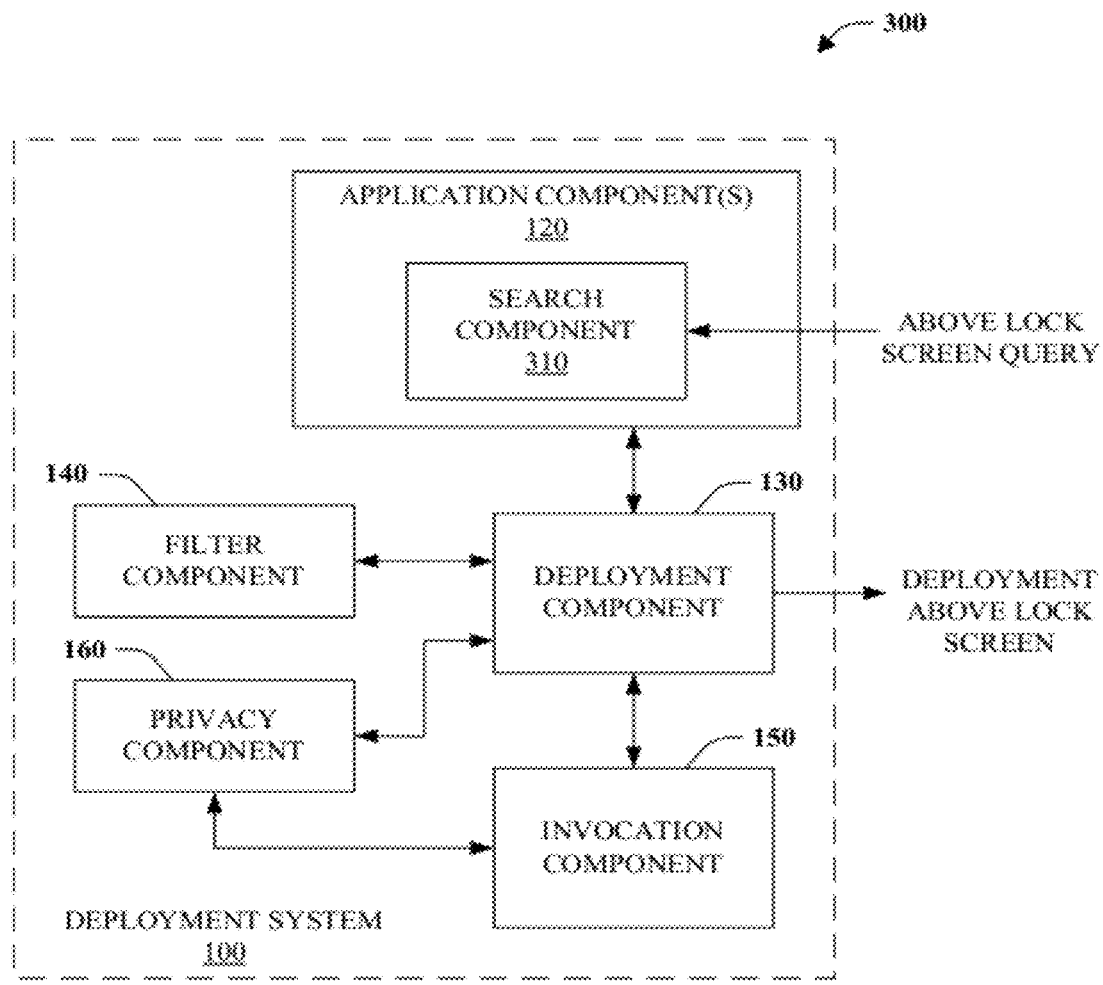
FIG. 3 is a block diagram of a system that facilitates querying while in a locked state.

FIG. 3 illustrates a system 300 that facilitates querying while in a locked state. The system 300 is a representation of the deployment system 100 in further detail. The system 300 enables a subset of application functionality to be exposed above a lock screen on a device or computer. The system 300 is an exemplary embodiment that deploys a search application above a screen lock for querying local or web data. Additionally, the system 300 does not depict the acquisition component 110 (not shown) for the sake of brevity since it is appreciated that a search application is obtained and configured for above the lock screen deployment.

The application components 120 can include a search component 310 that is configured to query local data on a device or computer as well as data on the Internet. As discussed, the search component 310 can be registered and permitted to deploy above a lock screen via the permission component (not shown) and/or the deployment component 130. For example, a lock screen can include a rendered mechanism that solely allows unlocking of the device as well as rendered components associated with the search component 310. Details of user interfaces are described in FIGS. 12-25.

With the search component 310 deployed above the lock screen, a subset of functionality associated with the search application (e.g., search component 310) is exposed while in a locked state. The search component 310 can acquire a query above the lock screen. For example, from a lock screen, a user can select to input a query via text input (e.g., utilizing a keypad, touchpad, touch screen), voice/audio input (e.g., utilizing a microphone associated with the device or computer), or image input (e.g., utilizing a camera or video camera associated with the device or computer). Moreover, as the query is input above the lock screen, search results can populate in real time. For example, as a user enters text, results can be populated based on the entered text. After processing the query, the search results are delivered above the lock screen and rendered. It is to be appreciated the search component 310 is executed above the lock screen and is permitted to access device or computer resources in order to provide a subset of functionality of the application component 120 (here, a search component for querying).

In order to access additional functionality for the search component 310, the invocation component 150 and/or the privacy component 160 can require authentication. In general, additional functionality of the search component 310 is executed below the lock screen which may require authentication (e.g., password entry). For instance, a selected search result can invoke authentication based on accessing a web link or web page for such selected result. In such example, prior to accessing a web link or web page, the authentication is performed to transition below the lock screen. However, it is to be appreciated that a user-defined setting can allow such additional functionality above the lock screen.

Furthermore, the system 300 can deliver application data and functionality unbeknownst to a user. For instance, a user may be unaware of functionality or features provided by applications that are installed on a computer. To that extent, the system 300 enables such functionality or data generated from such functionality to be rendered above a lock screen (e.g., while in a locked state). For instance, in terms of a search application (e.g., application delivers search results for a query), the search application can provide search results for a query as well as other passively collected data (e.g., GPS location, prior queries, web browsing history, email content, web site history, cookie information, text messages, call history, calendar data, to do lists, etc.).

Figure 4:
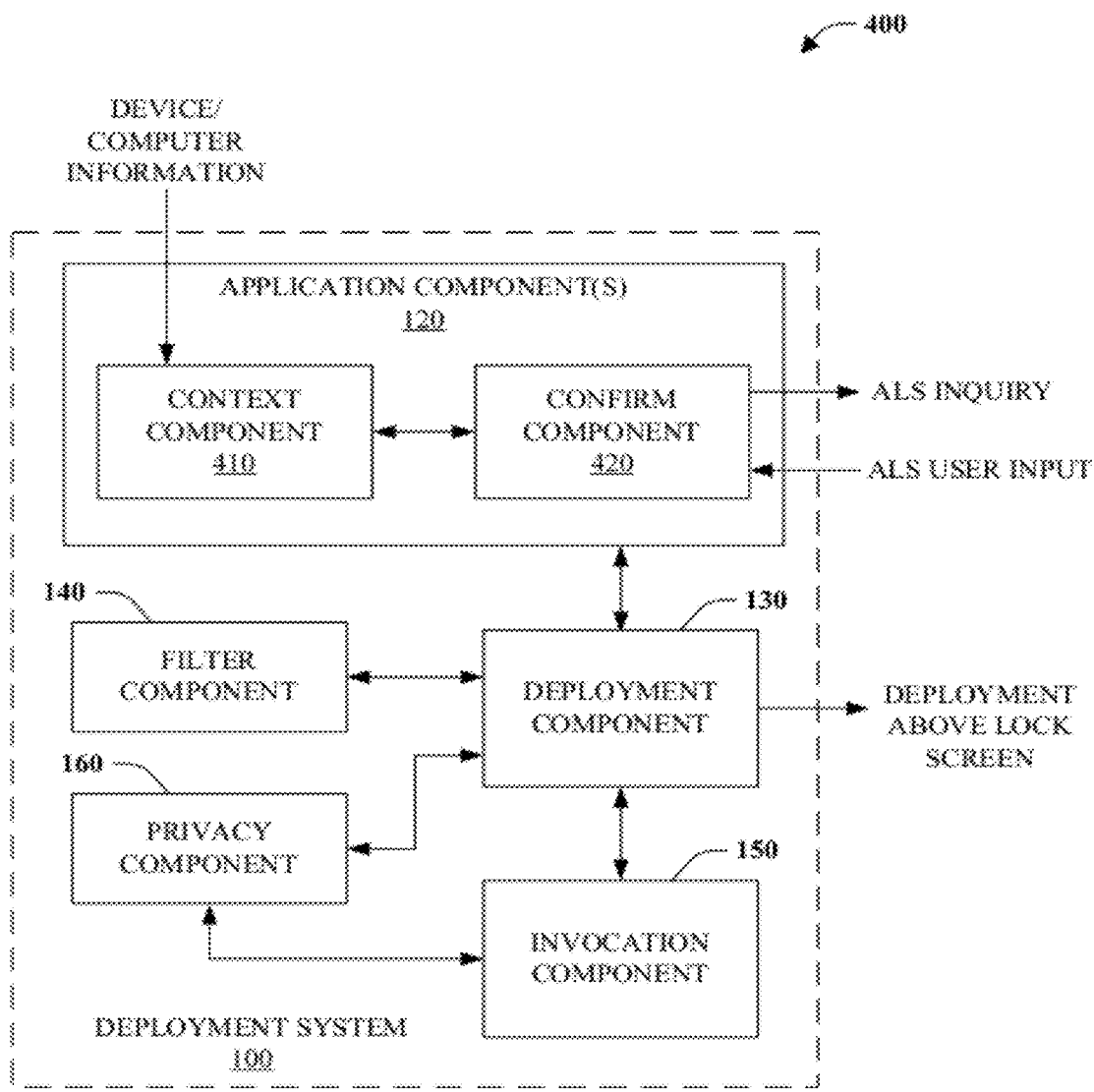
FIG. 4 is a block diagram of a content delivery system that communicates contextual data.

FIG. 4 illustrates a content delivery system 400 that communicates contextual data above a lock screen. The system 400 is a representation of the deployment system 100 in further detail. The system 400 enables a subset of application functionality to be exposed above a lock screen on a device or computer. The system 400 is an exemplary embodiment that deploys a context application above a screen lock for delivery of content based on context. Additionally, the system 400 does not depict the acquisition component 110 (not shown) for the sake of brevity since it is appreciated that a context application is obtained and configured for above the lock screen deployment.

The application components 120 can include a context component 410 that is configured to generate content based on context for a device or computer. As discussed, the context component 410 can be registered and permitted to deploy above a lock screen via the permission component (not shown) and/or the deployment component 130. For example, a lock screen can include a rendered mechanism that solely allows unlocking of the device as well as rendered components associated with the context component 410. Details of user interfaces are described in FIGS. 12-25.

The application components 120 can include a context component 410 that is configured to generate content based on context, wherein the generated content can be delivered above the lock screen. Stated differently, the context component 410 can be permitted to deploy a subset of functionality above the screen lock in which contextual data is rendered and available for access.

The context component 410 can leverage device information (e.g., information collected or gathered resident on the device) or computer information (e.g., information collected or gathered resident on the computer) in order to identify content based on context. Content based on context can be any suitable data such as, but not limited to, maps, mini-maps, weather data, traffic data, flight information, goods and services recommendations, and the like. Overall, the context component 410 can collect, receive, collect, etc. information and provide content that is reflective of particular situations or circumstances. For example, the content component 410 can leverage a location with a device or computer in order to identify content based on context for delivery above the lock screen.

The device or computer information that can be utilized by the context component 410 can be, but are not limited to, a Global Positioning System (GPS) data, a user-defined location data (e.g., keypad, voice, touchpad, touch screen, etc.), wireless receiver data (e.g., data communication with a particular hot spot, etc.), cellular receiver data (e.g., triangulation with cell towers, etc.), browser history, queries, device activity (e.g., calls, application accessed, etc.), device application data (e.g., social network application information, etc.), email data, text messages, time of day, calendar data, event listings, to do lists, among others. Moreover, the context component 410 can identify a mode of travel based on collected data such as speed, location, distance traveled, etc. In addition, the context component 410 can include settings that can be customized based on user preference (e.g., which data is available for content generation).

For clarity, a quick example can relate to a mobile device that includes a GPS for identification of a location, wherein the location is at a baseball stadium. The context application can be deployed above the lock screen such that a map of the stadium (e.g., seating, concessions, stores, food, etc.) can be the generated content that can be delivered on the lock screen. In another example, the content deployed above the lock can be baseball scores. Thus, a user can quickly access such relevant information at a glance of the mobile device lock screen, for instance. In another example, the context component 410 can identify a location as within a park. In this situation, contextual information such as, but not limited to, weather and park hours can be populated above the lock screen to the user. In still another example, the context component 410 can deploy a notification above the lock screen that a friend from a social network is within a particular distance.

Continuing with FIG. 4, the application components 120 can include a confirm component 420 that is configured to facilitate generating content based on context. In general, the confirm component 420 can be also deployed above the lock in order to confirm accuracy of content generated by the context component 410. Specifically, the confirm component 420 can send inquiries that are rendered above the lock screen (ALS) and receive responses (e.g., user input) to such inquiries above the lock screen (ALS). These inquiries can be simple questions that allow confirmation or denial of generated content accuracy. It is to be appreciated that the confirm component 420 can be short and precise with inquiries as well as infrequent so as to not annoy or clutter activity above the lock screen.

For example, the context component 410 may ascertain that a user is on his or her way to work based on a location data (e.g., speed, geographic position, etc.). In this situation however, the user may be going to a meeting that is on a similar route as the one used for work. The confirm component 420 can render an inquiry above the lock screen (ALS) that states "Are you going to work?" with the option of selecting "Yes" or "No." This simple affirmation (e.g., user input above the lock screen (ALS)) for the context component 410 greatly increases accuracy as well as provides minimal intrusion or annoyance in terms of clutter above the lock screen. Moreover, it is to be appreciated that the confirm component 420 can be optimally employed while the device indicates traveling from one location to another (e.g., car, bus, subway, on foot, etc.), wherein confirmation can be deployed above the lock screen to assist in predicting activity or identifying potential final destinations.

Turning now to the example with a search application as depicted in FIG. 3, various techniques can be utilized to launch or access data associated with the search application. In other words, a user can access the search application that is executing above the lock screen with an entry point.

It is to be appreciated that at least three different entry points can be provided with respect to a search application. First, an entry point is offered to search functionality above the lock screen, which may require an alternate gesture to launch. It is to be appreciated that the entry point can be offered for search functionality above the lock screen with a gesture, wherein the location of the gesture on the screen indicates which application to launch. For instance, a sliding gesture can unlock the device, whereas a similar sliding gesture (originating and located at a different point on the device screen) can execute a subset of functionality above the lock screen. Second, an entry point can be offered to a contextually appropriate search experience above the lock screen, which can be accessed directly by an alternate gesture. This entry point may also include useful data or information that may allow the user to complete a task without further interaction. For example, if a user is in a mall, airport, or shopping district, a link to a venue map can be provided. In another example, if a user is driving, a set of tools that are useful while driving such as traffic or nearby parking can be delivered. In yet another example, if a user is waiting at a bus stop, a link to a real-time bus schedule can be provided, but displayed as "next#5 bus in 3 min." The third entry point offered can be to a personally relevant search experience delivered above the lock screen, which can be accessed directly by an alternate gesture. This experience may involve inferences made by analyzing user behavior over time. For instance, if there is a traffic accident on a freeway a user takes every day, a notification can be offered that the commute will be delayed with a link to the traffic incident. A full-screen experience can also be afforded that compliments any of the above scenarios. For example, a full screen venue map, traffic map, and transit schedule map can be offered when a user is in a venue, stopped on a freeway, or stopped on a bus, respectively.

Figure 5:
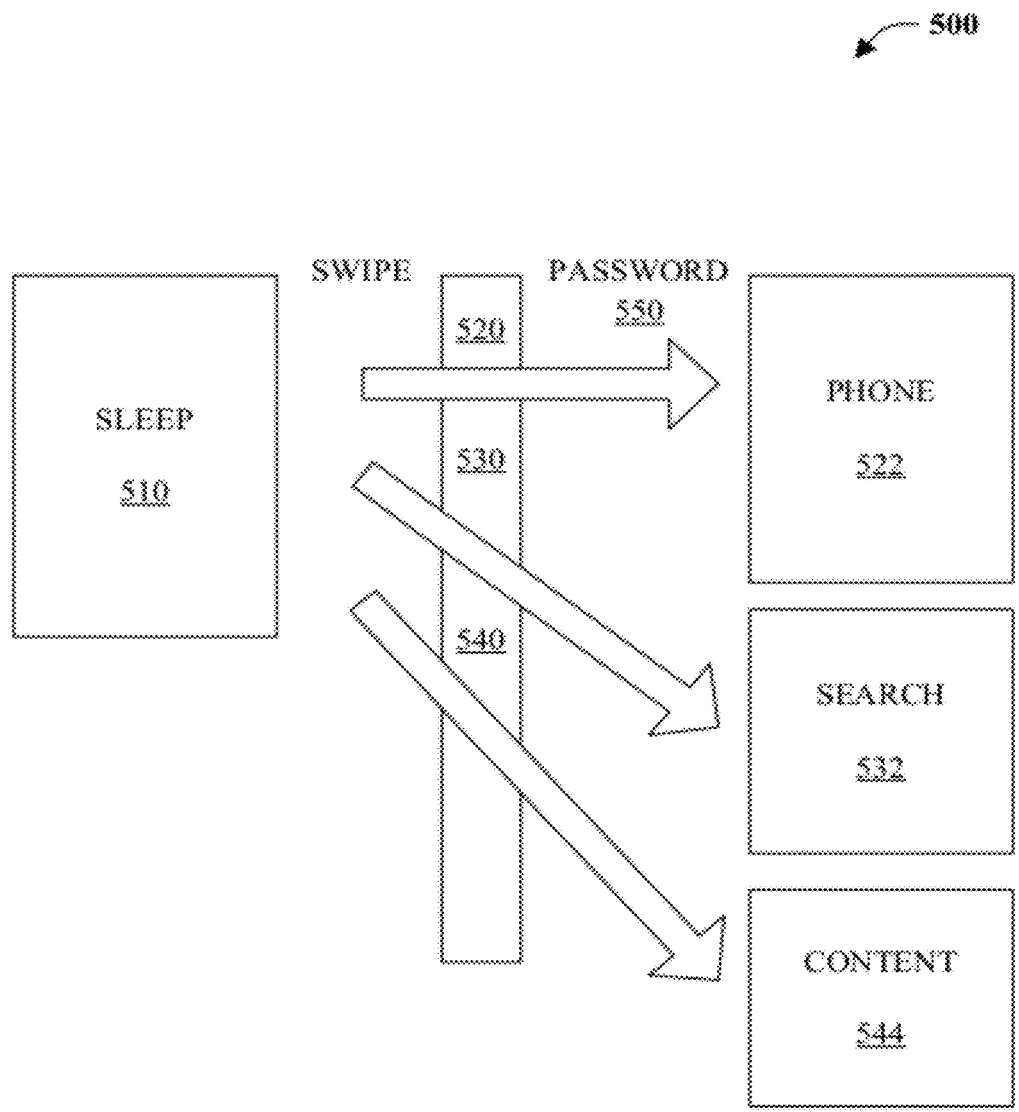
FIG. 5 is a block diagram illustrating how application functionality can be accessed.

FIG. 5 is a block diagram illustrating how application functionality can be accessed. A computer, such as a mobile phone, can begin in a sleep, or locked, state 510. Utilizing a first gesture 520 such as a swipe the phone can transition from the locked state 510 to a phone state 522, for example corresponding to a main screen (a.k.a., home screen, idle screen) below the lock screen allowing conventional interaction. Utilizing a second gesture 530 such as a different swipe the phone can transition from the locked state 510 to a search state 532 above the lock screen enabling search queries to be input and results to be returned. Employing a third gesture 540, a transition can occur from the locked state 510 to a content state 544 affording relevant information above the lock screen. Based on implementation, a password 550, or other identifying input, may be required to transition states for example from the lock state 510 to the phone state 522. Additionally, when transitioning from an application implementation above the lock screen to below the lock screen, a password may be required.

Further, if a password is required, a non-personalized search experience can be provided above the lock screen in a secure way (e.g., sandboxed), and a user can be asked to enter a password at appropriate times if required. Of course, a user can specify the degree or extent that information known about a user that is allowed to be used from nothing (e.g., anonymous) to everything or somewhere in between.

In addition, it should be appreciated that a plurality of different gestures can be employed such as, but not limited to, gesturing different locations, tapping different locations, moving content (e.g., drag application icon to lock icon to unlock or moving lock icon to application icon to unlock), specific gesture patterns (e.g., horizontal swipe, vertical swipe, horizontal swipe followed by a downward vertical swipe, tracing a letter), ending gestures on different locations, moving covers (e.g., gesture from first corner to another corner in a diagonal swipe, where the first corner is an application icon), or sliding windows (e.g., swipe motion up, swipe motion down, swipe motion right, swipe motion left, where start of swipe is a smaller window for an application icon). In general, it is to be appreciated and understood that the subject innovation includes any suitable gesture input from a lock screen state.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the deployment system 100 or one or more sub-components thereof can employ such mechanisms to efficiently determine or otherwise infer applications or portions thereof that can be deployed above a lock screen or while in a locked state.

In view of the exemplary systems described supra, methodologies that may be implemented in accordance with the disclosed subject matter will be better appreciated with reference to the flow charts of FIGS. 6-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
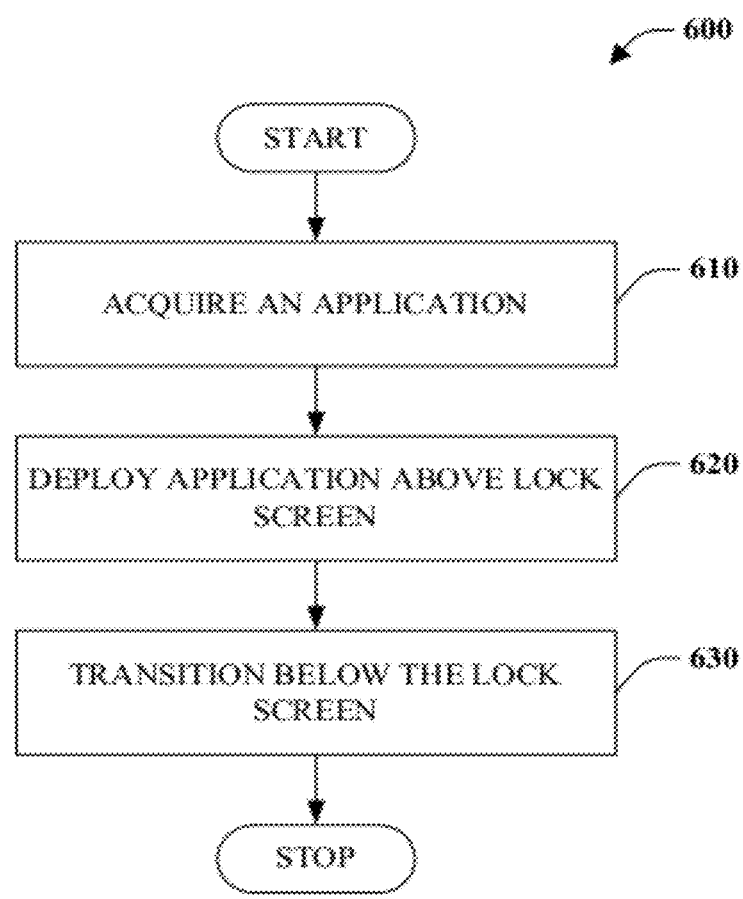
FIG. 6 is a flow chart diagram of a method of application deployment.

Referring to FIG. 6, a method 600 of deploying software applications or portions thereof is depicted. At reference numeral 610, a software application or portion thereof is received, retrieved, or otherwise obtained or acquired. For example, a user can obtain an application such as a search application or social network application for deployment. At reference numeral 620, an acquired application is deployed above the lock screen of a computer. Once deployed, information can be provided to and from the user thereby enabling interaction with at least a subset of application functionality. Where additional interaction or functionality is desired, a transition can be made at reference numeral 630 from above the lock screen interaction to below the lock screen interaction. In other words, the lock, or lock screen, is transcended.

Figure 7:
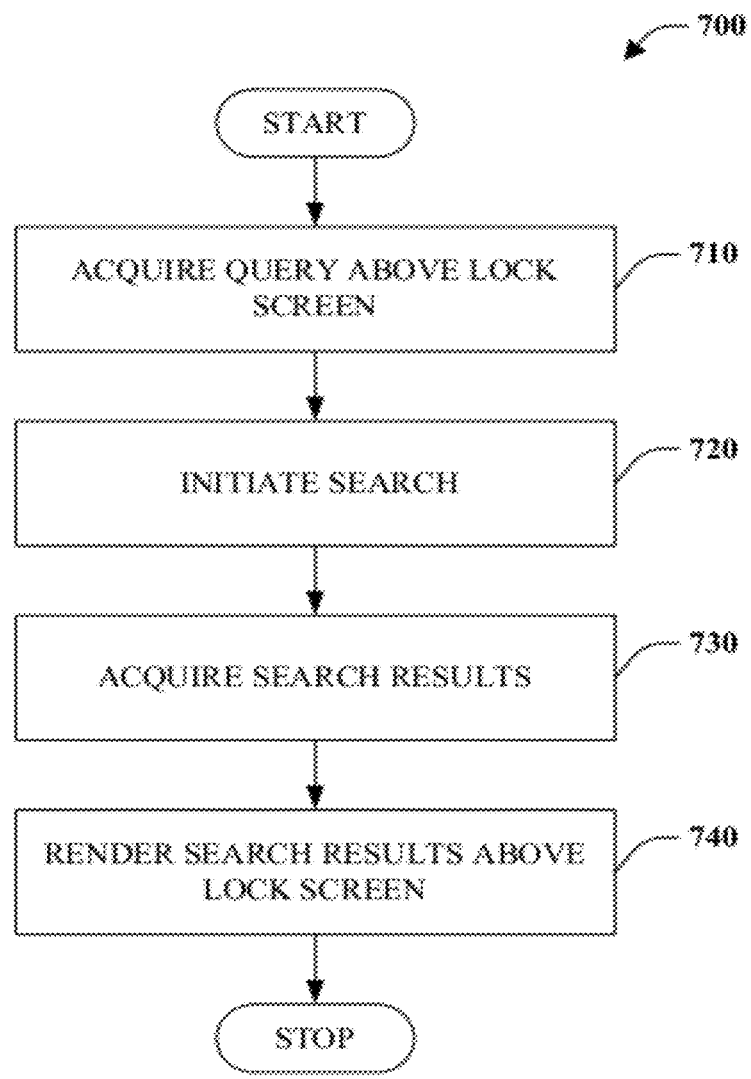
FIG. 7 is a flow chart diagram of a method of operation of an exemplary search application deployed above a lock screen.

FIG. 7 is a flow chart diagram of a method 700 of operation of an exemplary search application deployed above a lock screen. At reference numeral 710, a search query is received, retrieved, or otherwise obtained or acquired above the lock screen of a computer. For example, a search query can be input by a user via text, voice, or picture directly from the lock screen or with respect to a different screen. Additionally or alternatively, a search query can be specified with respect to automatic provisioning of pertinent information as a function of context (e.g., location, preferences, user browser history, community browser history, recent interactions . . . ). Of course, the utilization of such context information can be regulated by a user to ensure a level of privacy desired by the user.

At reference numeral 720, a search based on the query can be initiated, and search results can be acquired at numeral reference numeral 730. In accordance with one embodiment, the search functionality can be provided by a search-engine application resident on the computer and accessed from an interface above the lock screen by way of one or more application programming interfaces (APIs). Other implementations are possible and contemplated including separate applications for above a lock screen and below a lock screen. At reference numeral 740, the acquired search results can be rendered above the lock screen. In other words, the method 700 allows integration of search experiences above a lock screen, thus simplifying access to search functionality as well as content provided thereby.

Figure 8:
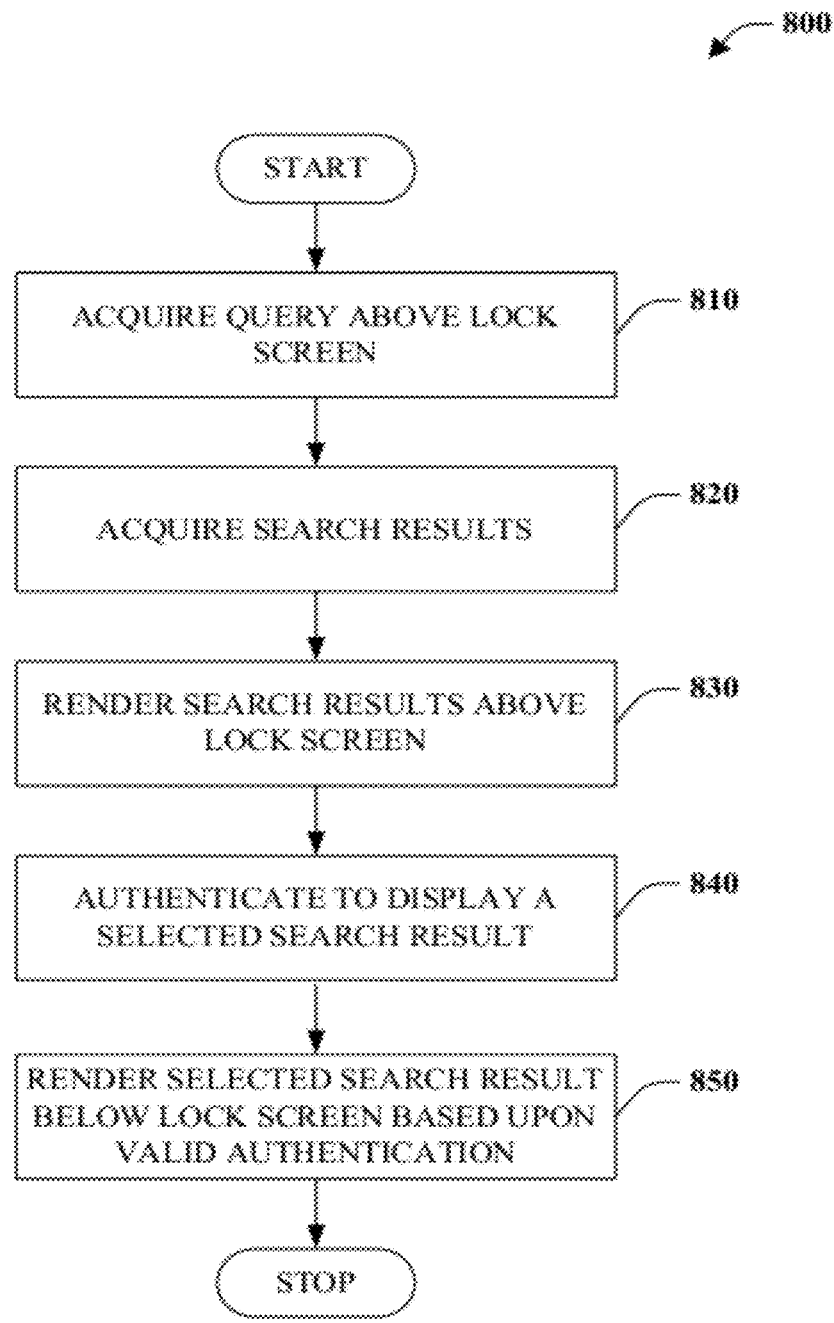
FIG. 8 is a flow chart diagram of a method of delivering query results.

FIG. 8 is a method 800 of delivering query results. At reference numeral 810, a query above a lock screen can be acquired. For instance, the query can be in a text format, an audio or voice format, or an image format (e.g., utilizing a camera or video camera). At reference numeral 820, search results can be identified and acquired. It is to be appreciated that the search results can be acquired in real-time (e.g., populated as a query is input). Moreover, the search results can be acquired above the lock screen such that device or computer resources are unlocked in order to perform the search. At reference numeral 830, search results can be rendered above the lock screen. Stated differently, the acquired search results can be delivered to a screen associated with a locked state. In addition, it is to be appreciated that additional features of the search engine can be employed above the lock in order to render search results to the device or computer. For example, the search engine or search application can leverage information such as, but not limited to, query history, location, emails, text messages, and the like in order to delivery relevant search results for a particular query. For example, a user can query "shoes" and search results can be obtained but with the added information gathered such as location or a shoe brand web site recently viewed.

At reference numeral 840, authentication can be performed in order to display a selected search result. For instance, if a search result is selected via an input, an authentication can be executed, wherein the authentication can be, but is not limited to, a password entry, a personal identification number (PIN) entry, a thumbprint, facial recognition, retina detection, secret question answer, biometric data, among others. At reference numeral 850, the selected search result can be rendered below the lock screen based upon a valid authentication. Stated differently, the locked state is relieved of a secure state in order to enable further application functionality upon selection of a search result and authentication.

Figure 9:
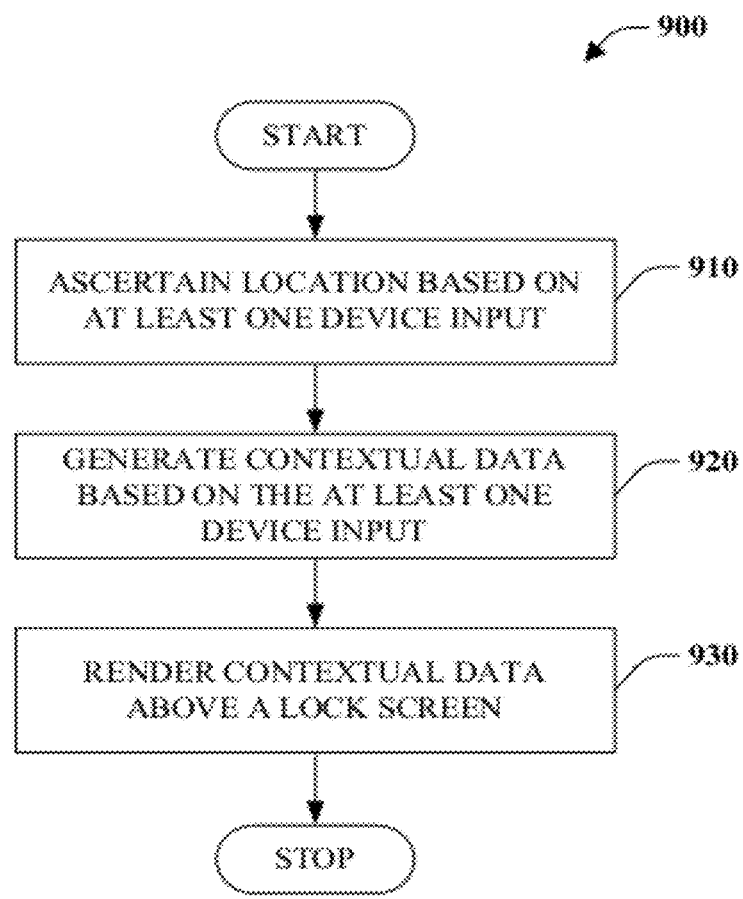
FIG. 9 is a flow chart diagram of a method of populating contextual data during a locked state.

FIG. 9, a flow chart diagram of a method 900 of populating contextual data during a locked state is illustrated. At reference numeral 910, a location can be ascertained based upon at least one device input. For example, a device input can be a Global Positioning System (GPS) receiver, a user-defined location (e.g., keypad, voice, touchpad, touch screen, etc.), wireless receiver (e.g., data communication with a particular hot spot, etc.), cellular receiver (e.g., triangulation with cell towers, etc.), among others.

At reference numeral 920, contextual data can be generated based on the at least one device input. For example, contextual data is any image, text, graphic, or displayable data that correlates with the location ascertained from the device input. As discussed, the contextual data can be a map, weather information, a mini-map, flight information, traffic data, goods location, service locations, among others. At reference numeral 930, contextual data can be rendered above a lock screen. For instance, the lock screen can render an unlock mechanism as well as contextual data generated based upon at least one device input.

Figure 10:
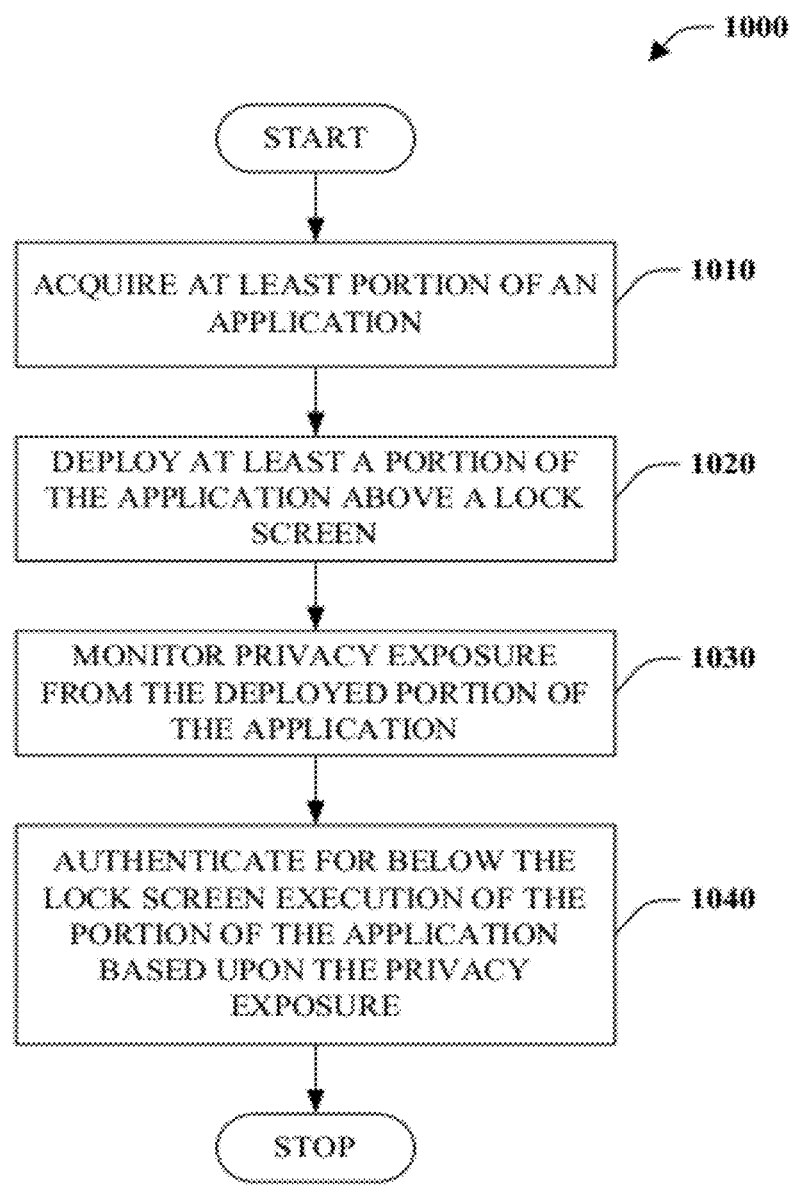
FIG. 10 is a flow chart diagram of a method of managing application execution based upon data exposure.

FIG. 10 is a method 1000 of managing application execution based upon data exposure. At reference numeral 1010, at least a portion of an application can be acquired. At reference numeral 1020, at least a portion of the application can be deployed above a lock screen (e.g., while in a locked state). In particular, at least a subset of functionality of the application can be implemented above the lock screen. At reference numeral 1030, privacy exposure can be monitored from the deployed portion of the application. It is to be appreciated that data can further be cleaned of any personal identifying information (e.g., anonymous filter). Moreover, a certain privacy policy can be ensured to be met in terms of exposing data related to deployed portions of the application above the lock screen. At reference numeral 1040, below the lock screen execution of the portion of the application can be authenticated based upon the privacy exposure. Stated differently, functionality of an application that utilizes non-sensitive data is accessible above the lock screen, whereas application functionality that employs sensitive data is accessible below the lock screen after authentication.

Figure 11:
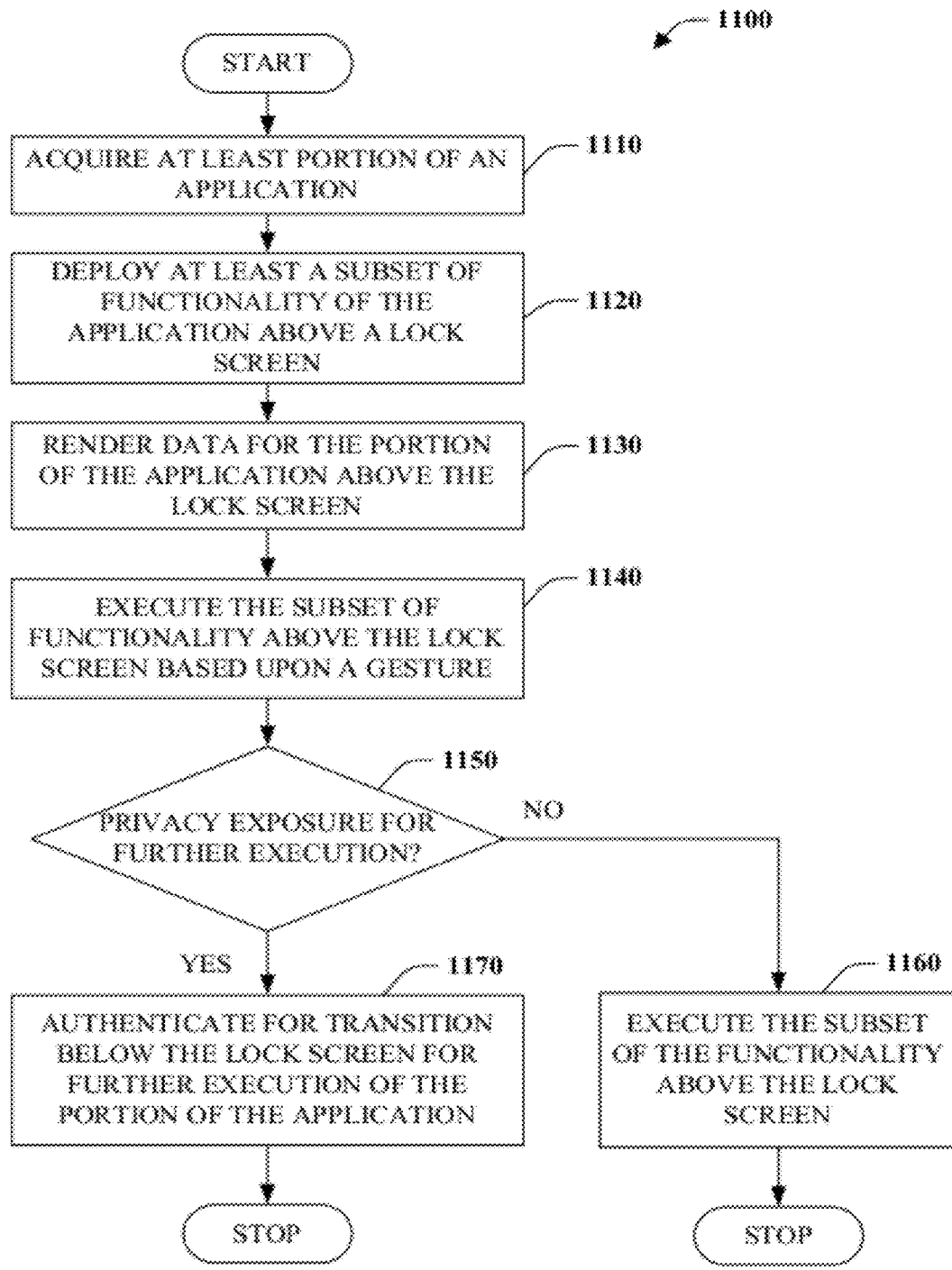
FIG. 11 is a flow chart diagram of a method of deploying a portion of an application while in an idle and locked state.

FIG. 11 is a flow chart diagram of a method 1100 of deploying a portion of an application while in an idle and locked state. At reference numeral 1110, at least a portion of an application can be acquired. At reference numeral 1120, at least a subset of functionality of the application can be deployed above a lock screen (e.g., while in a locked state). At reference numeral 1130, data can be rendered for the portion of the application above the lock screen. Stated differently, data can be delivered and displayed independent of a locked state of a device or computer. At reference numeral 1140, the subset of the functionality can be executed above the lock screen based upon a gesture. For example, a gesture can be detected that triggers execution of a subset of functionality for the application, wherein such gesture and functionality are employed above the lock screen.

At reference numeral 1150, a determination is made whether there is privacy exposure for further execution of the subset of functionality related to the application. If the privacy exposure is non-existent or negligible, the method 1100 continues to reference numeral 1160. If the privacy exposure is existent or substantial, the methodology 1100 continues to reference numeral 1170. It is to be appreciated that the privacy exposure threshold can be user-defined, customized, or at a default setting. Continuing to reference numeral 1160 if the privacy exposure is non-existent or negligible, the subset of functionality of the application can be executed above the lock screen. If the privacy exposure is existent or substantial, authentication can be implemented for a transition below the lock screen for further execution of the portion of the application at reference numeral 1170.

What follows are a number of screen shots associated with aspects of the subject disclosure as provided with respect to a mobile phone. Such screen shots are merely exemplary and provided to graphically depict at least one embodiment of aspects of the disclosure. Of course, the subject disclosure is not intended to be limited to the location or presentation of graphical elements provided since there are a myriad of other ways to achieve the same or similar result. Further, while described with respect to mobile phones, the disclosed subject matter is not limited thereto and is suitable for other computers including mobile (e.g., tablets, laptops . . . ) as well as typically stationary devices (e.g., desktop computer, terminal)

Figure 12:
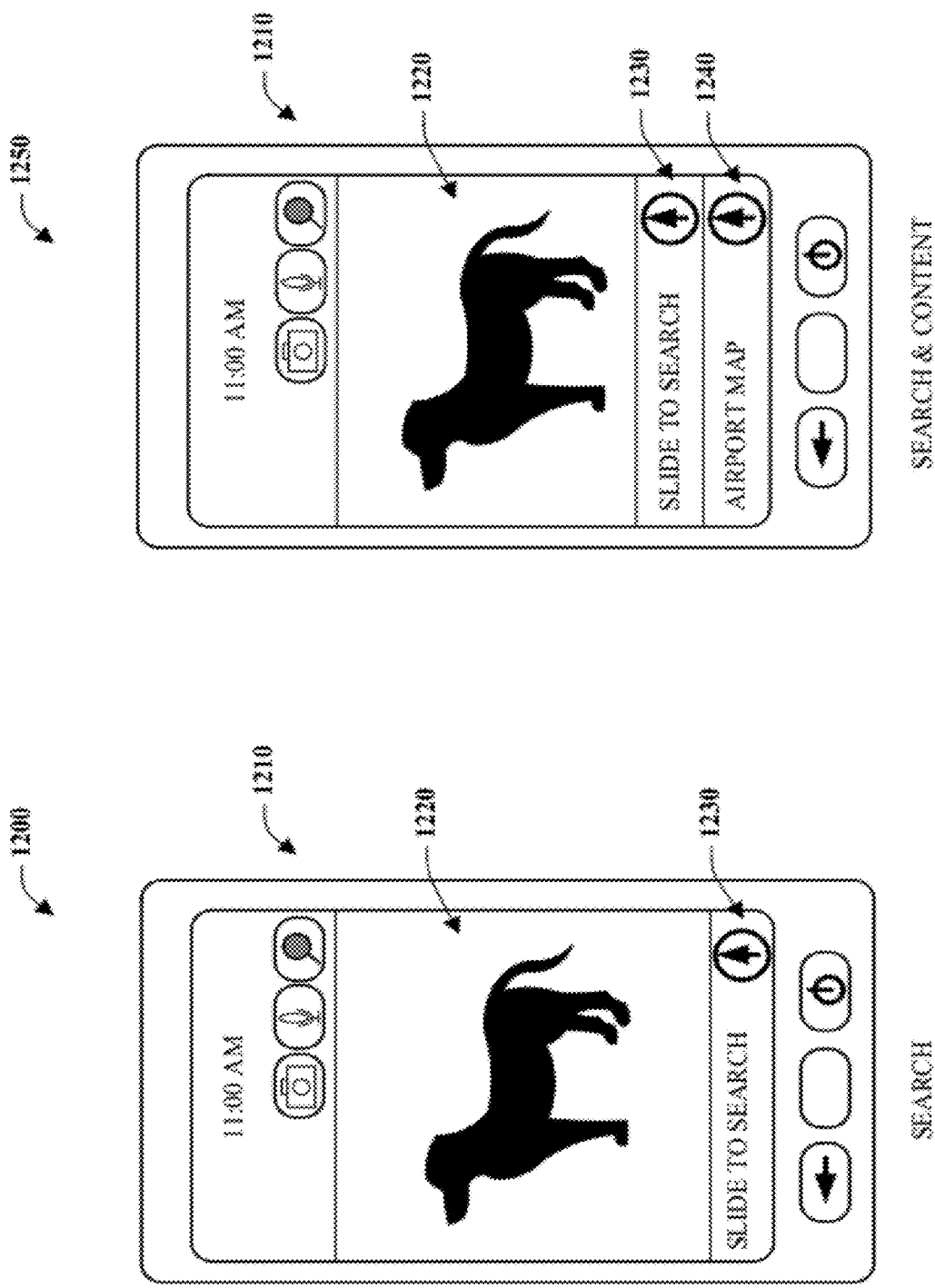
FIGS. 12-25 are exemplary screenshots illustrating search functionality exposed above the lock screen.

FIG. 12 illustrates two screenshots 1200 and 1250 representing two exemplary entry points or other states with respect to a search application, among other things. More specifically, screenshot 1200 illustrates search and screenshot 1250 depicts search and content. There are several similarities between the screenshots. First, both provide icons 1210 for directly initiating search utilizing text, voice, and pictures as will be described further below. Additionally, each screenshot provides a "picture of the day" 1220 provided by the search application. Further, a rectangular box 1230 is provided at the bottom for initiation of a search by performing a "sliding up" gesture, for example. Screenshot 1250 differs from screenshot 1200 in that it also includes a rectangular box 1240 that provides relevant content based on context. Here, the content corresponds to an airport map, which can accessed by a gesture of sliding the box up, for instance.

Figure 13:
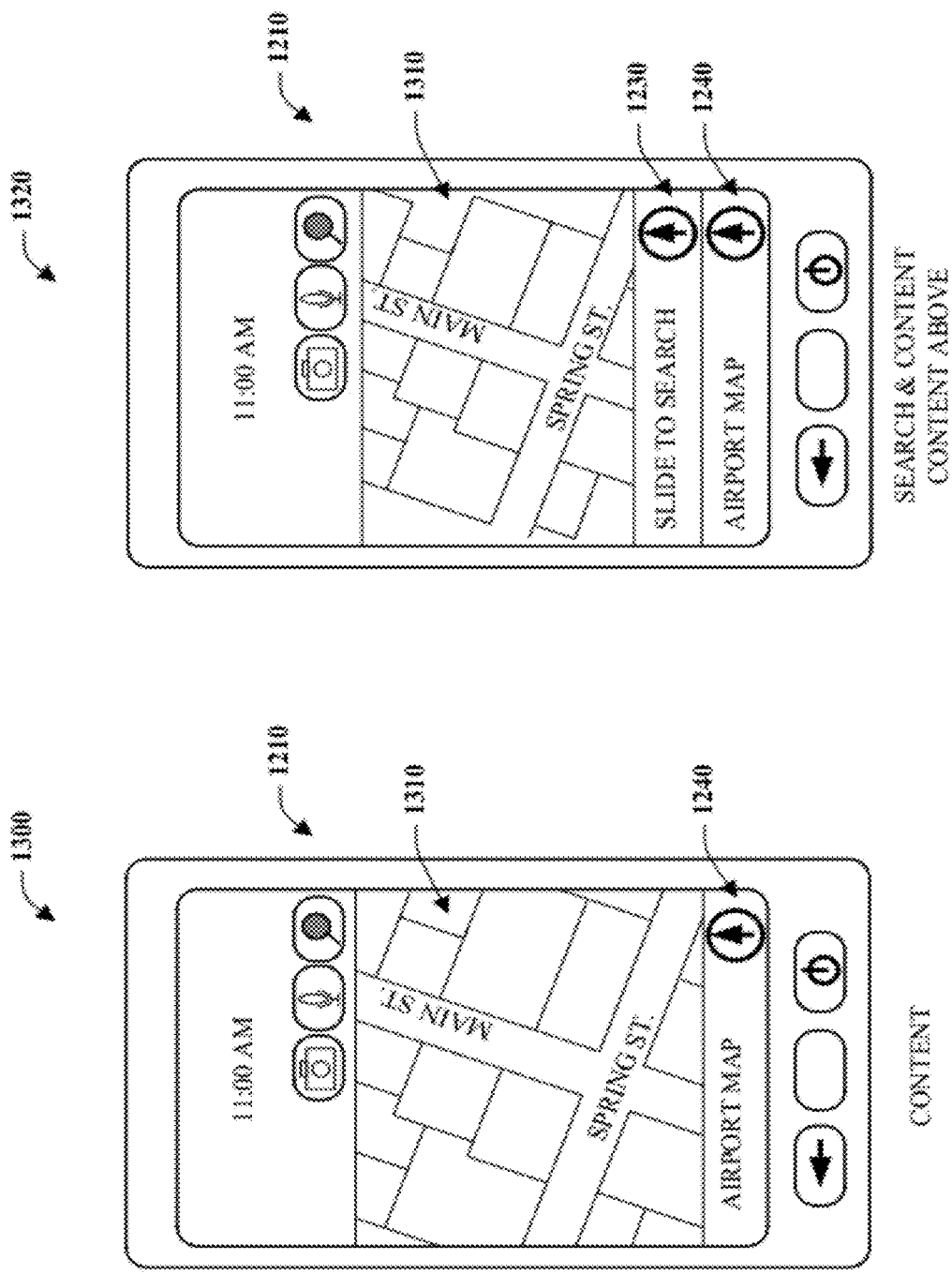

FIG. 13 illustrates two additional entry points or other screenshots 1300 and 1320. Screenshot 1300 depicts a situation where content occupies a majority of screen space. Here, rectangular box 1240 identifying an airport map is provided on the bottom of the screen. Moreover, a map 1310 associated with a user's current location is displayed on the majority of the screen space. Screenshot 1320 illustrates a similar layout except that the rectangular box 1230 enabling a search query to be specified is included. Nevertheless, it is to be appreciated that a query can be made even with respect to screenshot 1300 by selecting one of the search initiating icons 1210 corresponding to a specific search mode (e.g., text, voice, and picture).

Figure 14:
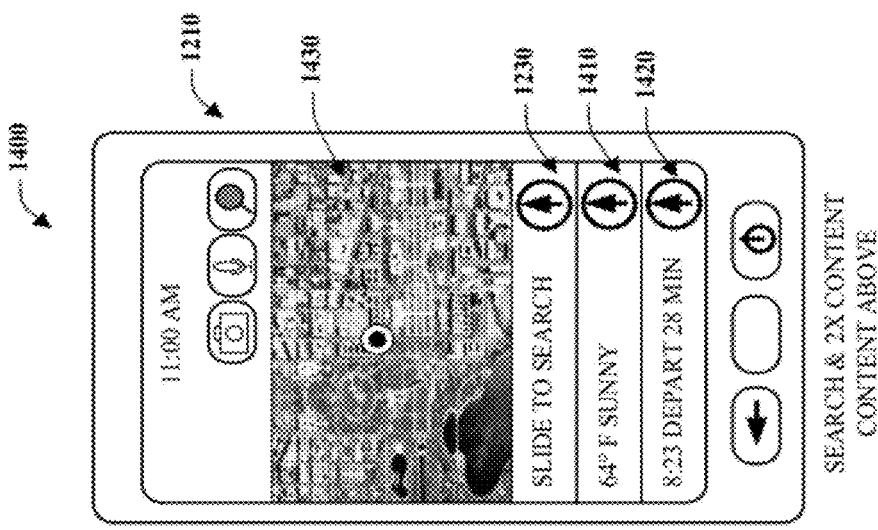

FIG. 14 illustrates another screenshot representing an entry point or other screenshot 1400. Search interfaces are provided by the rectangular box 1230 and the search initiating icons 1210, as previously described. Additionally, twice the amount of content is provided with respect to additional rectangular boxes 1410 and 1420 residing on the bottom of the screen. The rectangular box 1410 provides information about the current weather, and upon executing a sliding gesture with respect to the rectangular box 1410, a link may be provided to extended weather information. The rectangular box 1420 supplies airline departure information for with respect to a user's flight including the time of departure, "28 min." By executing a sliding gesture with respect to rectangular box 1420, additional flight information may be provided such as links to check in electronically or change flights. Still further, contextual information is provided via a point-of-view picture 1430 corresponding to the user's current location (e.g., satellite graphics, aerial view photos, graphical representation of maps, etc.) as determined via an embedded global positioning system (GPS) component, for example.

Figure 15:
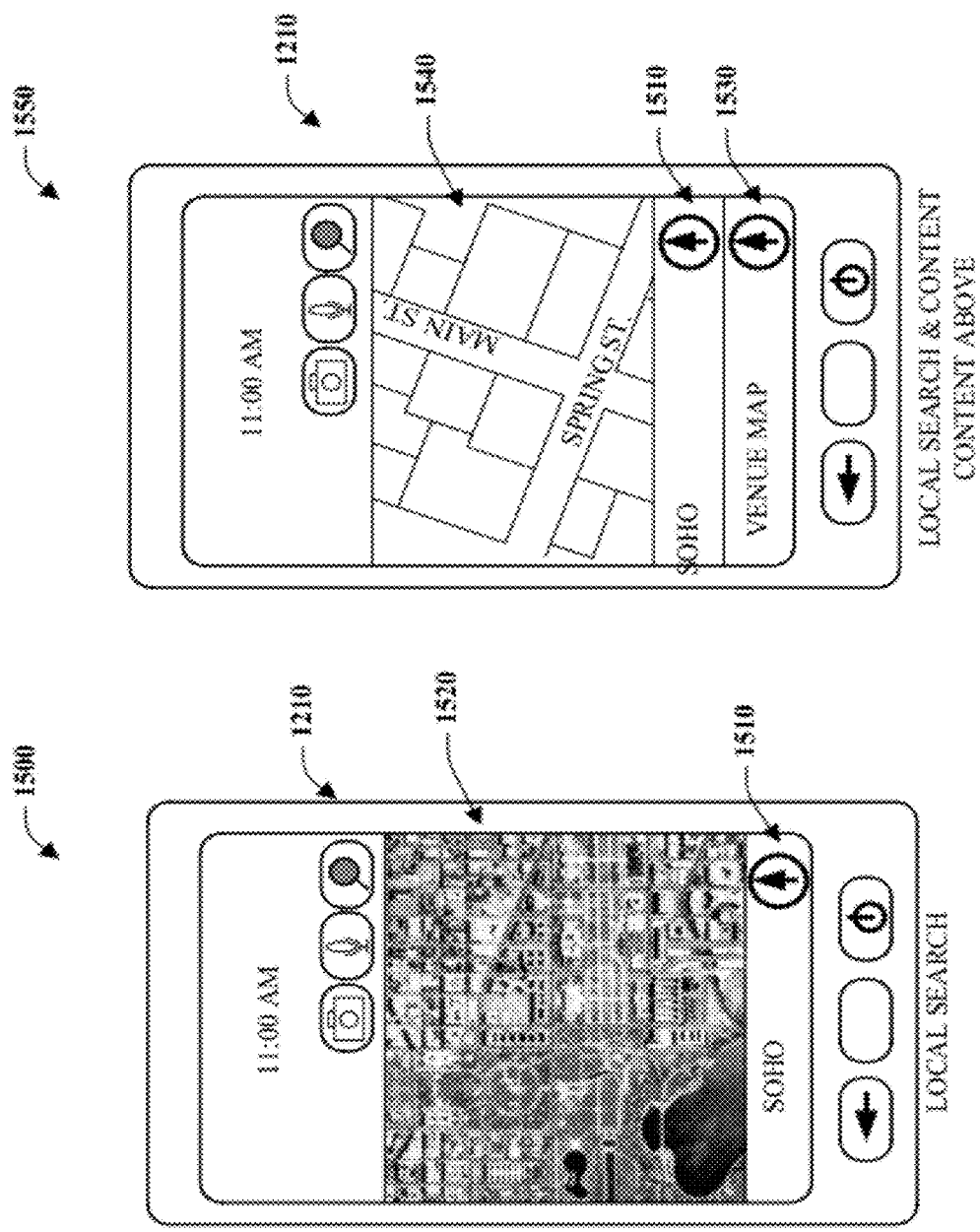

FIG. 15 provides two screenshots 1500 and 1550 that include local search elements. While general search can be provided, local search can provide more pertinent information with respect to a particular geographical area. As shown, screenshot 1500 includes a rectangular box 1510 at the bottom of the screen that upon selection/activation provides local search with respect to "SOHO" a neighborhood in Manhattan in New York City. Further, a point-of-view picture 1520 is displayed of the area. Screenshot 1550 provides similar functionality but adds a rectangular box 1530 with context information pertaining to a venue map (e.g., mall, shopping district, arena district . . . ) and displays a map of the local area 1540 rather than a picture.

Figure 16:
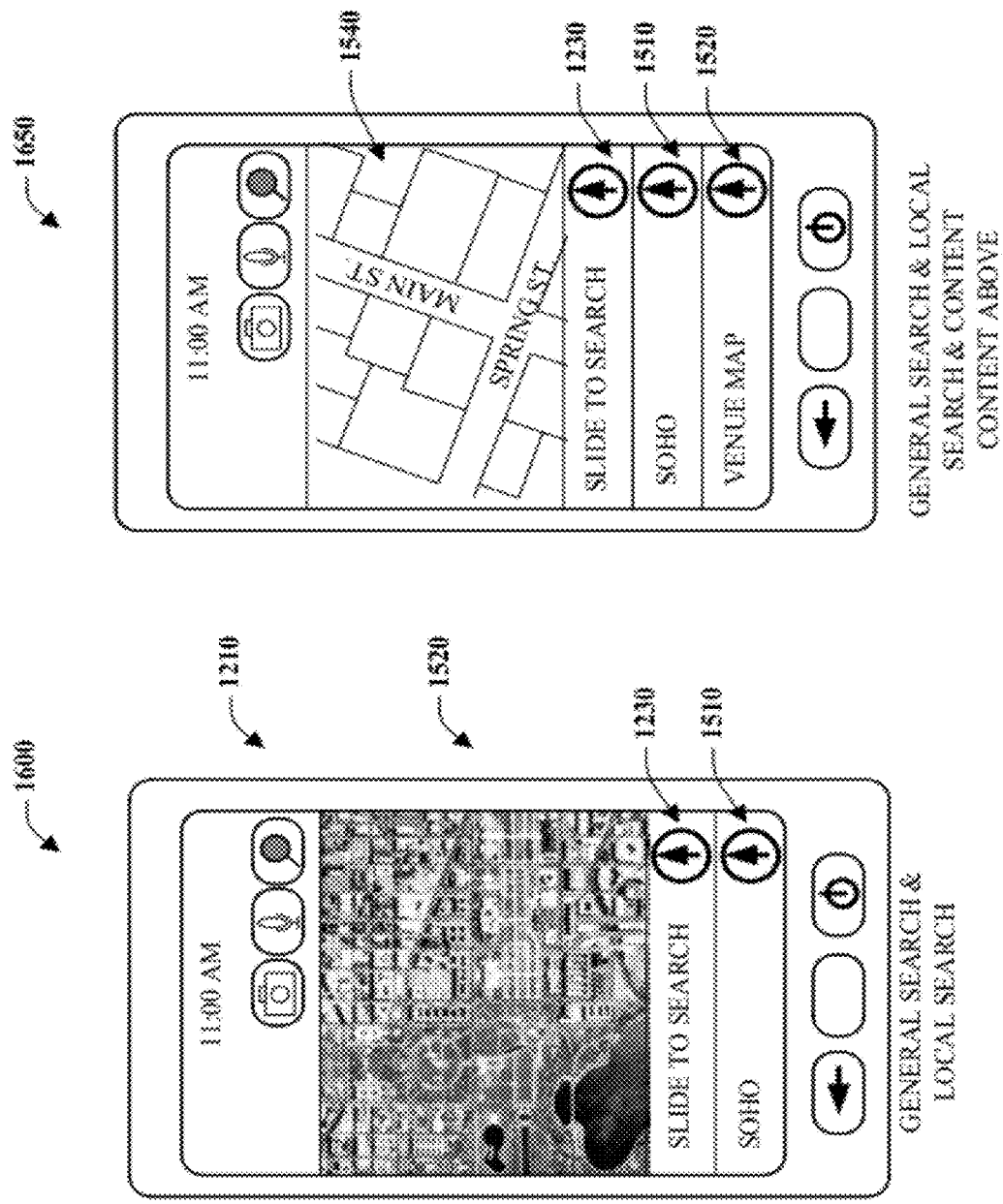

FIG. 16 shows two screenshots 1600 and 1650 that include both general and local search. Screenshots 1600 and 1650 correspond to the screenshots 1500 and 1550 of FIG. 15, with the addition of the rectangular box 1230 for initiating a general search upon selection/activation, for example by performing a slide-up gesture.

Figure 17:
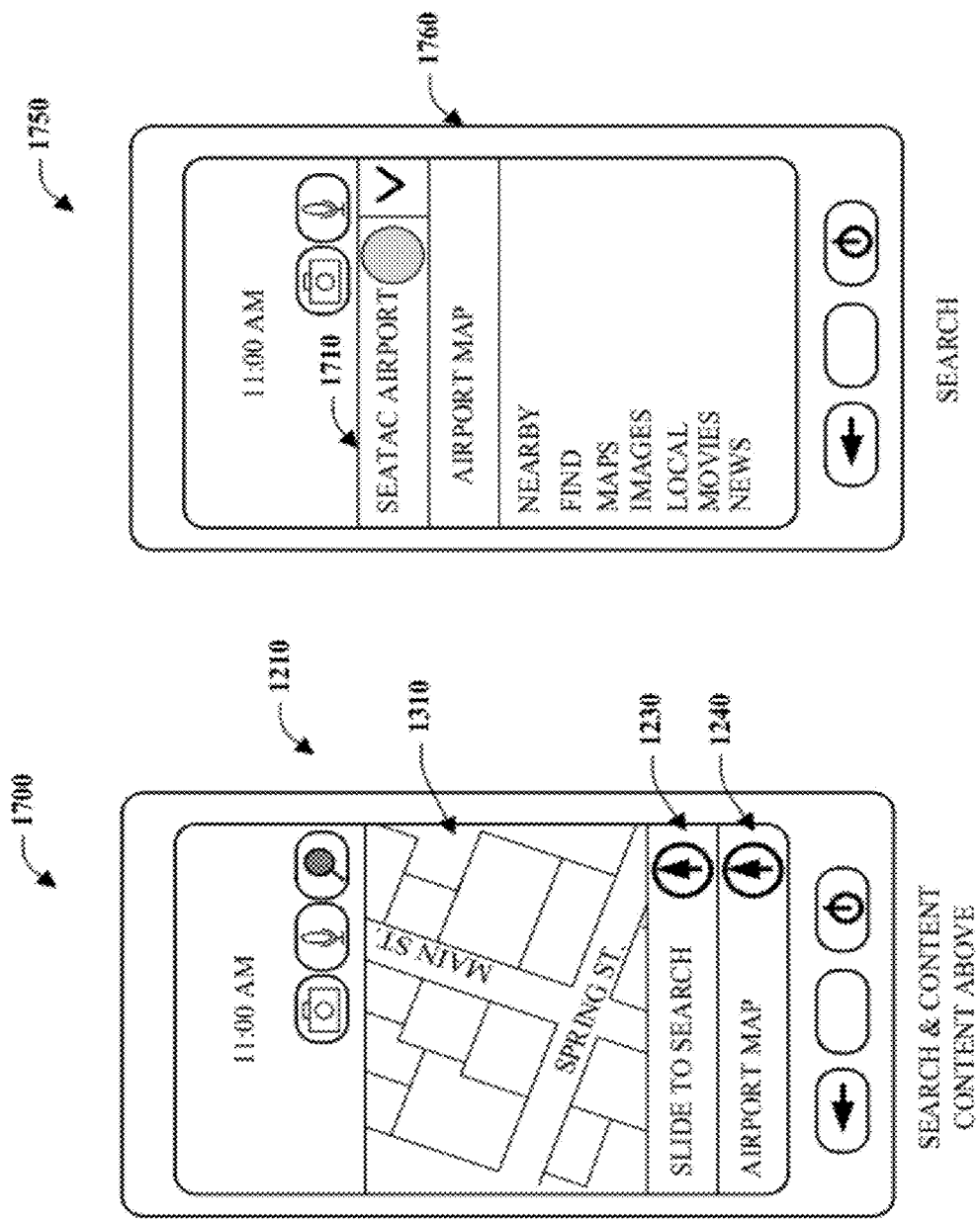
Figure 18:
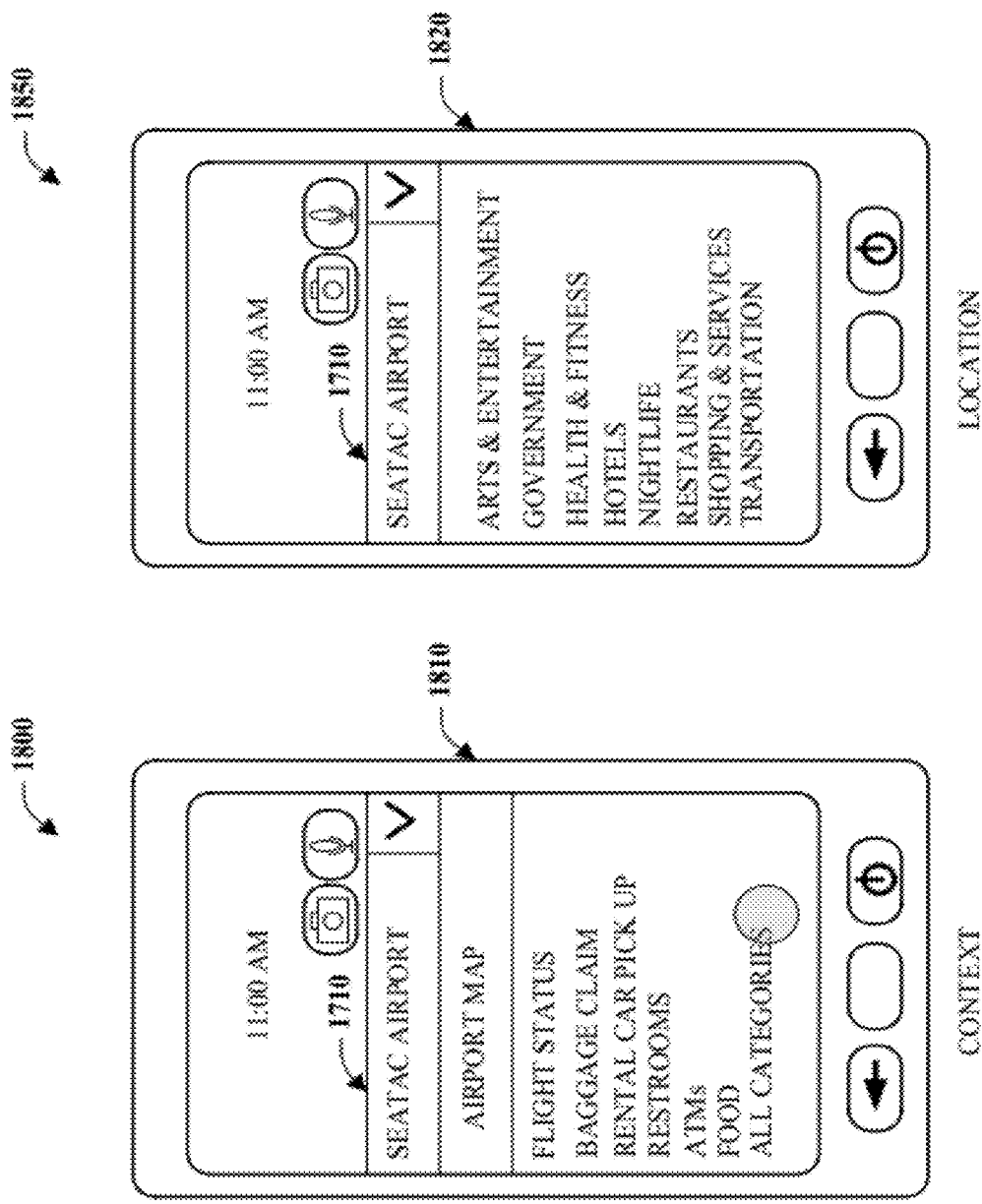

FIGS. 17 and 18 provide four screenshots 1700, 1750, 1800, and 1850 that graphically depict a sample interaction. Screenshot 1700 is a reproduction of the screenshot 1320 of FIG. 13 including the two rectangular boxes 1230 and 1240 for general search and content, respectively as well as the map 1310 corresponding to a user's current location. Upon selection of the search rectangular box 1230, such as touching the box and sliding upward, screenshot 1750 can be rendered. Here, a text box 1710 is supplied for text entry of a query as well as a drop down menu 1760 of terms to guide search including information corresponding to the airport and airport map (e.g., contextual identified content) previously presented with respect to the rectangular box 1240 of screenshot 1700. Upon selection of "SeaTac Airport," as represented by the hashed dot thereon, screenshot 1800 of FIG. 18 can be rendered.

Turning to FIG. 18, the text box 1710 remains, but a new drop down menu 1810 is presented focused on topics related to the airport including the airport map. Selection of "All categories" (depicted with a hashed dot) causes a new drop down menu 1820 to be displayed with general topics of interest related to the airport as provided in screenshot 1850.

Figure 19:
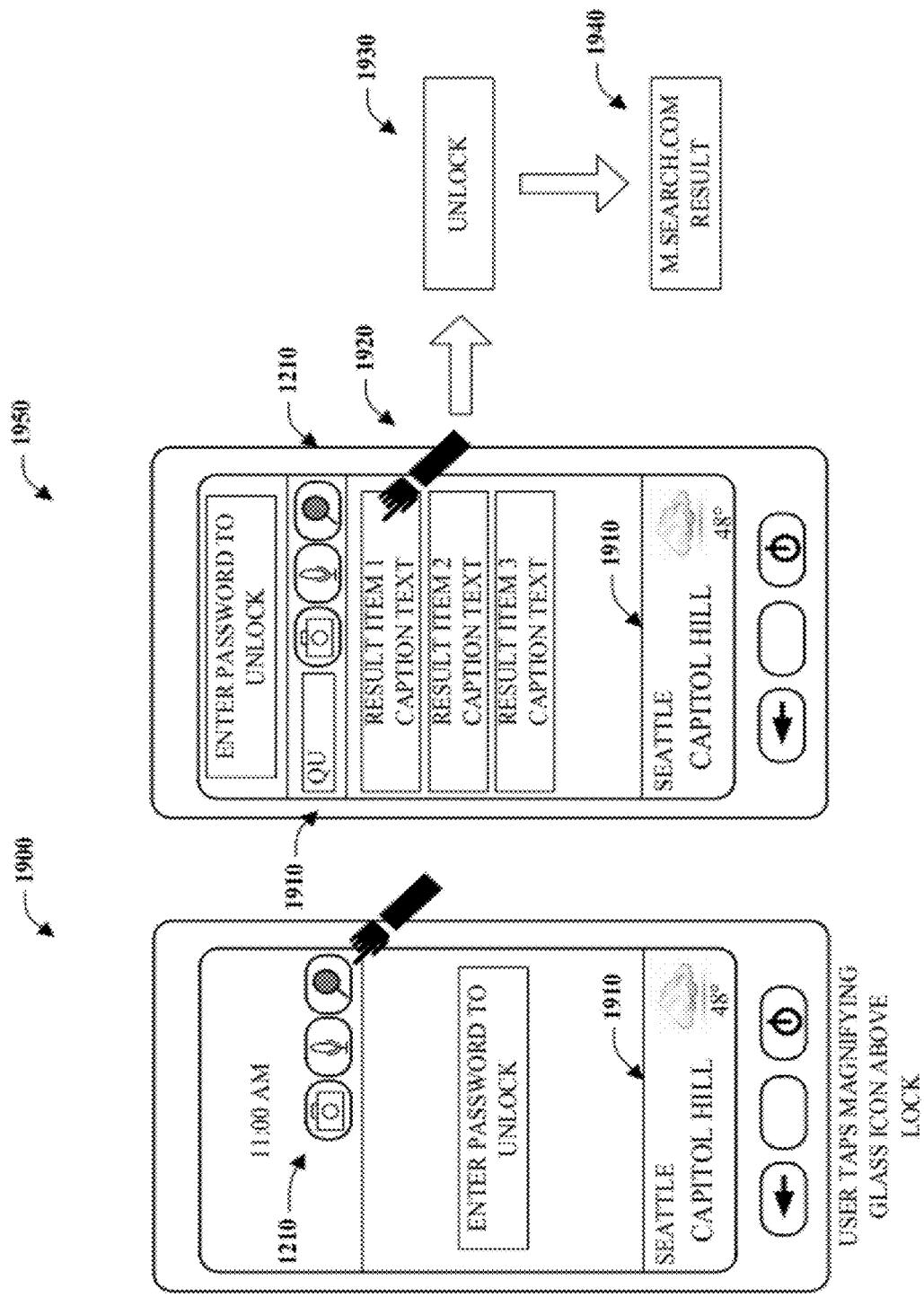

FIG. 19 illustrates utilization of a text query on the lock screen. Screenshot 1900 depicts a lock screen including a number of search initiating icons 1210 to initiate a search as well as local weather information displayed in a rectangular box 1910 at the bottom of the screen. Upon selection of the text query icon (by clicking on the icon once, for example), represented as a magnifying glass, screenshot 1950 is rendered. Here, the text box 1710 is displayed for accepting a text-based search query. As text is entered, or upon submitting the complete text query, a list of results 1920 can be displayed. Such results can correspond to web page links (URLs). If a user clicks on one of the result sites to view a corresponding web page, the mobile phone may need to be unlocked. Upon unlocking the phone at 1930, utilizing a gesture and/or password (e.g., authentication), results can be fetched and returned to the user below the lock screen at 1940.

Figure 20:
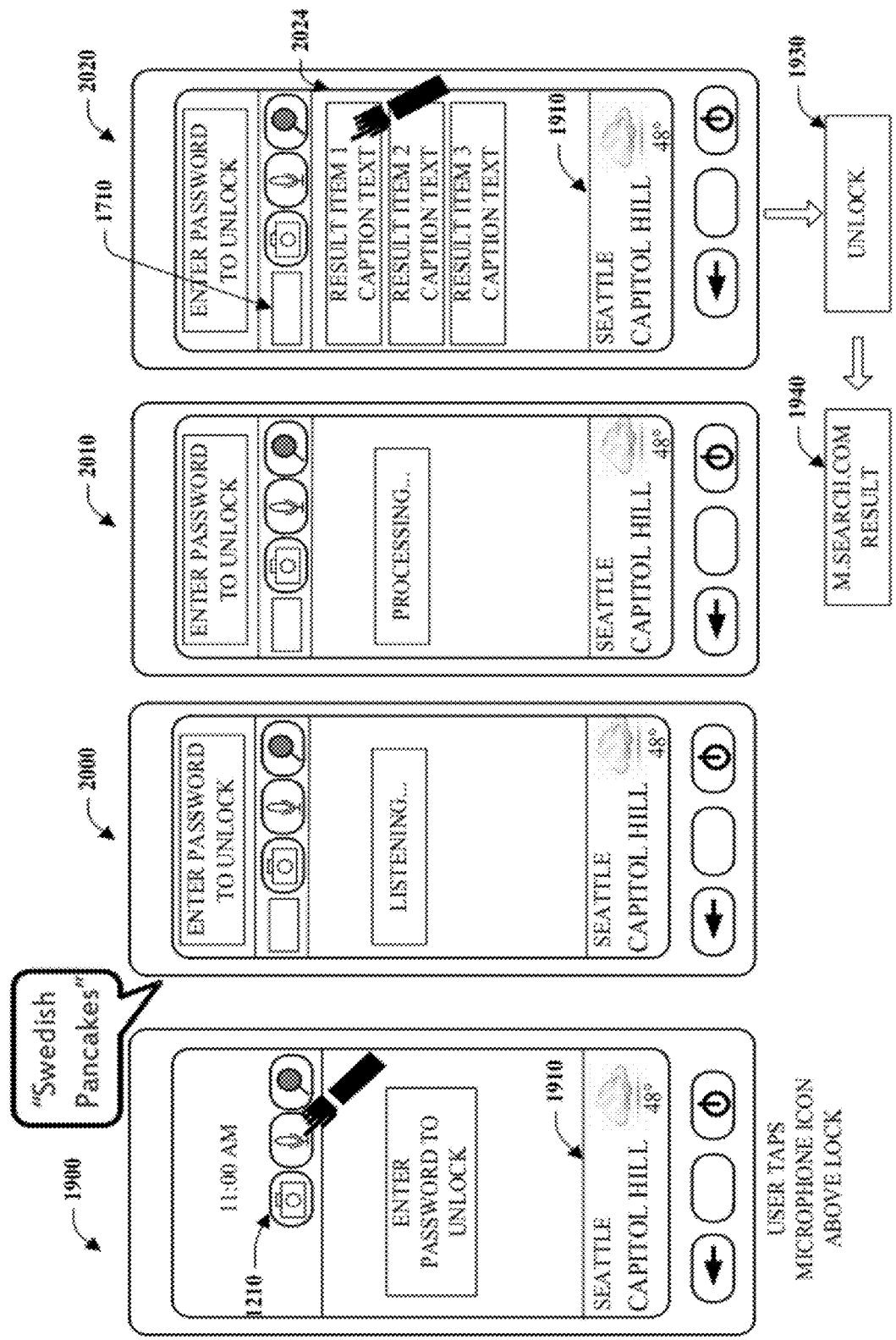

FIG. 20 depicts voice search on the lock screen. Screenshot 1900 from FIG. 19 illustrates a lock screen including the search initiating icons 1210 and local weather information displayed in a rectangular box 1910 at the bottom of the screen. Upon selection of the voice query icon, represented as a microphone, the screenshot 2000 is rendered indicating it is listening for the query. The user can then say a query such as "Swedish Pancakes," and upon receipt, screenshot 2010 can be rendered noting that the query is currently being processed. Finally, screenshot 2020 can be displayed including the text of the query in the text box 1710 (text "Swedish Pancakes" not shown) and a list of search results 2024. If a user desires to navigate to web page identified as a query result by clicking thereon, the mobile phone can be unlocked 1930 and results are returned 1940 similar to the manner in which text queries are processed.

Figure 21:
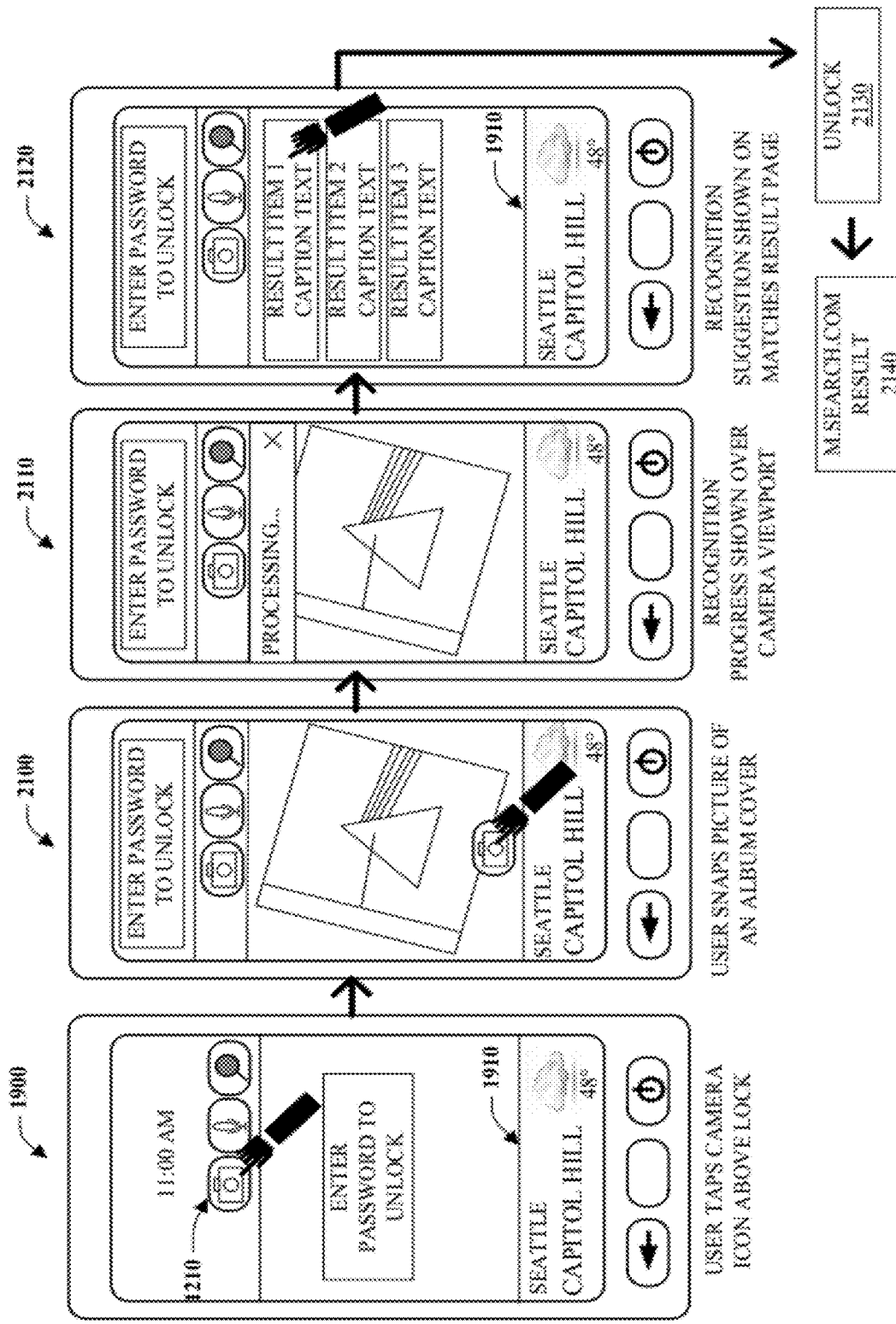

FIG. 21 illustrates image search above the lock screen. Screenshot 1900 illustrates a lock screen including, among other things, a series of icons 1210 for initiating a search. After selecting image search by clicking on the camera icon from the series of search initiating icons 1210, a user can take a picture with an integrated camera. Here, a picture is taken of an album cover. Utilizing a search-engine image recognition tool (e.g., search image recognition browser plug-in), the image is analyzed and matches returned. In particular, once the camera search is executed, the mobile device can capture an image 2100. Once the image is captured, the mobile device can display progress of the search/process 2110. As provided here, the matches can be presented to the user 2120. Upon tapping on one of the search results, the mobile device can be unlocked 2130 by providing appropriate authentication information (e.g., password, thumbprint, voice activation, face detection, etc.). This unlock 2130 allows the transition to below the lock screen. Successful entry of the authentication returns detailed results 2140.

Figure 22:
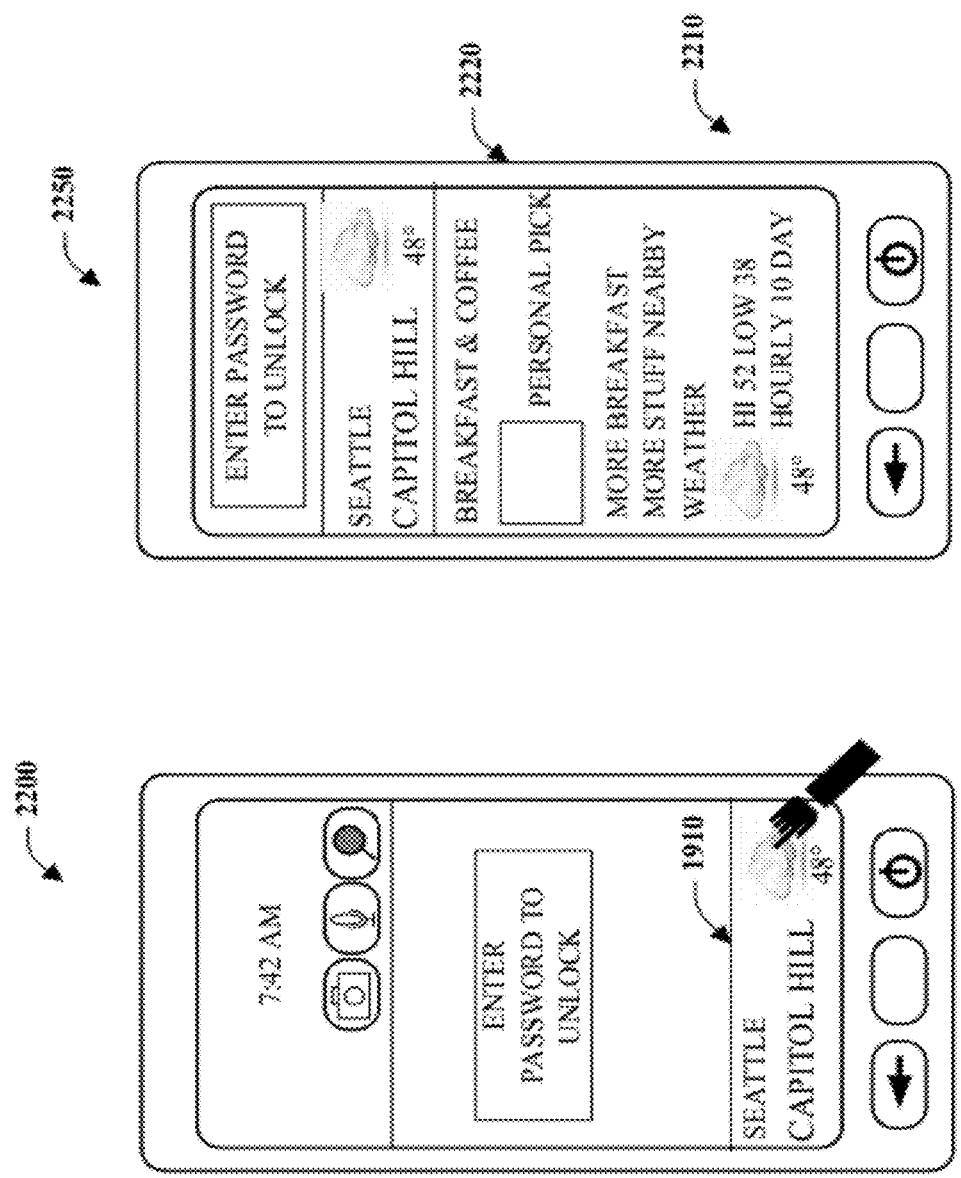
Figure 23:
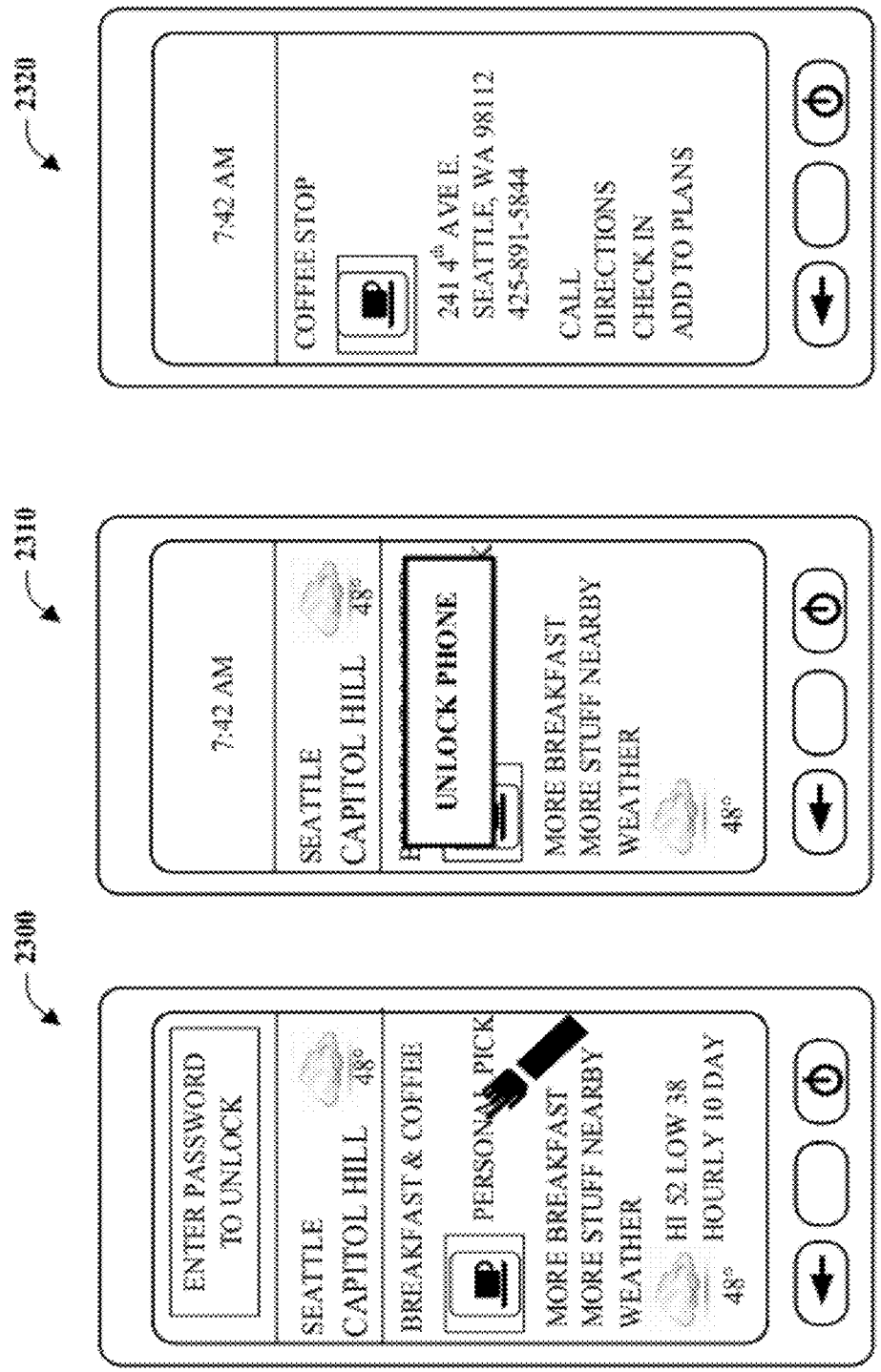

FIGS. 22 and 23 provide five screenshots, 2200, 2250, 2300, 2310, and 2320, illustrating interaction with content presented on the lock screen. Screenshot 2200 depicts a lock screen including content corresponding to local weather, presented in the rectangular box 1910. An upward swipe or flick gesture can cause screenshot 2250 to be rendered. In addition to more detailed weather information 2210, information regarding a breakfast restaurant 2220 can be presented. Such information can be determined to be relevant based on contextual information such as the time of day, location, and preferences, among other things. If a user selects the suggested restaurant by clicking on it, as shown by screenshot 2300, then the phone can require unlocking (e.g., authentication) as depicted by screenshot 2310. Upon successful unlock (e.g., authentication) via a particular gesture and/or password (among others), for example, screenshot 2320 can be produced providing more specific information regarding the restaurant as well as links to call, get directions, and check in, for example, in a web browser window.

Figure 24:
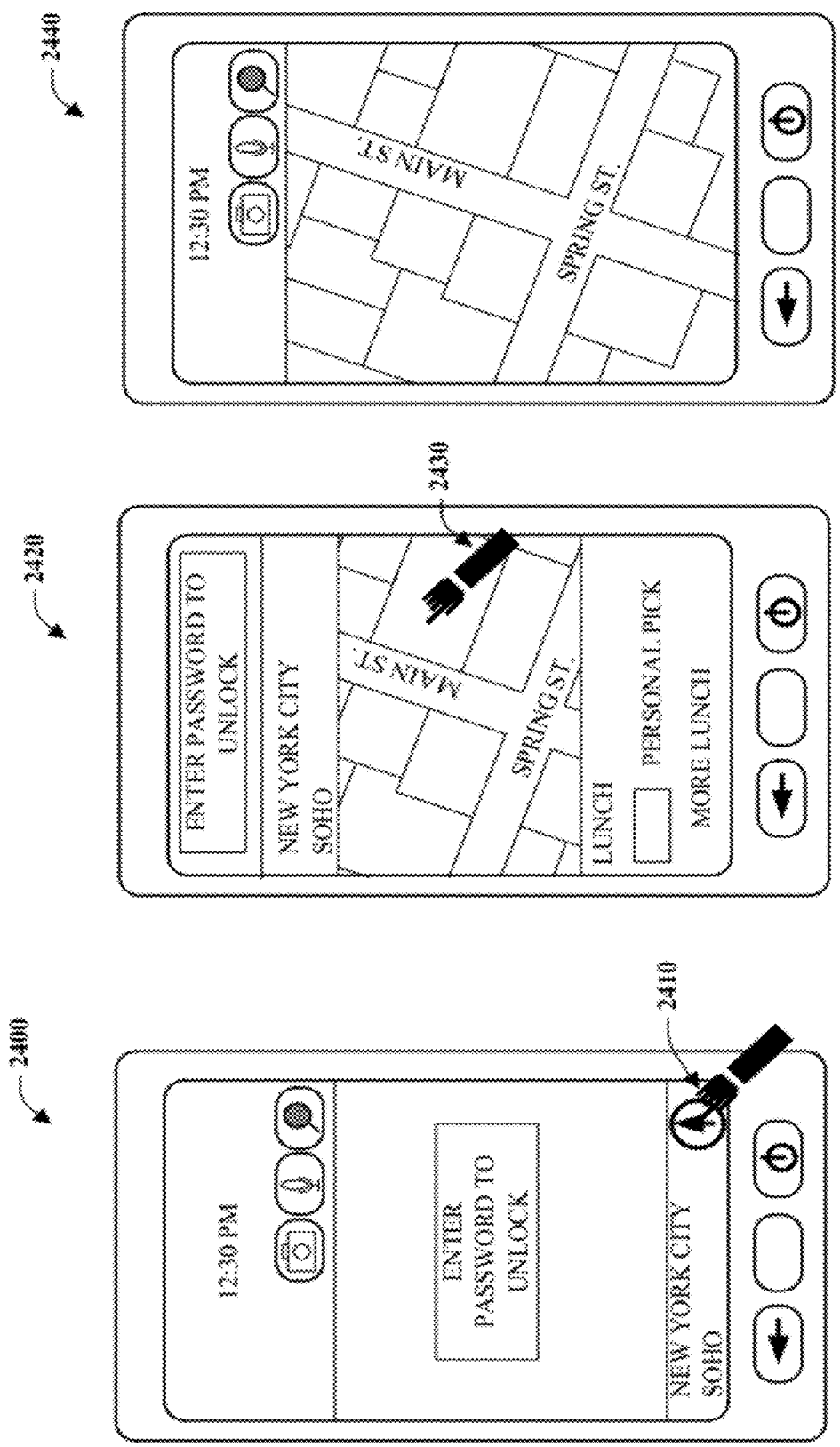

FIG. 24 depicts content interaction with respect to three screenshots 2400, 2420, and 2440. Screenshot 2400 illustrates a lock screen including a rectangular box 2410 providing content or content based on context. As shown here, the content or information includes a current location, namely "SOHO," "New York City," and an icon of a map. Upon a vertical gesture with respect to the rectangular box 2410, screenshot 2420 can be rendered. Among other things, a map 2430 is displayed occupying about a quarter of the display. Additionally, lunch restaurants along with a personal pick can be presented. Such information can be determined to be relevant based on contextual information such as the time of day, location, and preferences, among other things. Selection via tapping, for example, can result in the map being expanded to full screen as shown in screenshot 2440. It is to be appreciated that based on the user's security and privacy settings, an unlock may be required to transition from the map to full screen (e.g., screen shot 2420 to screenshot 2440).

Figure 25:
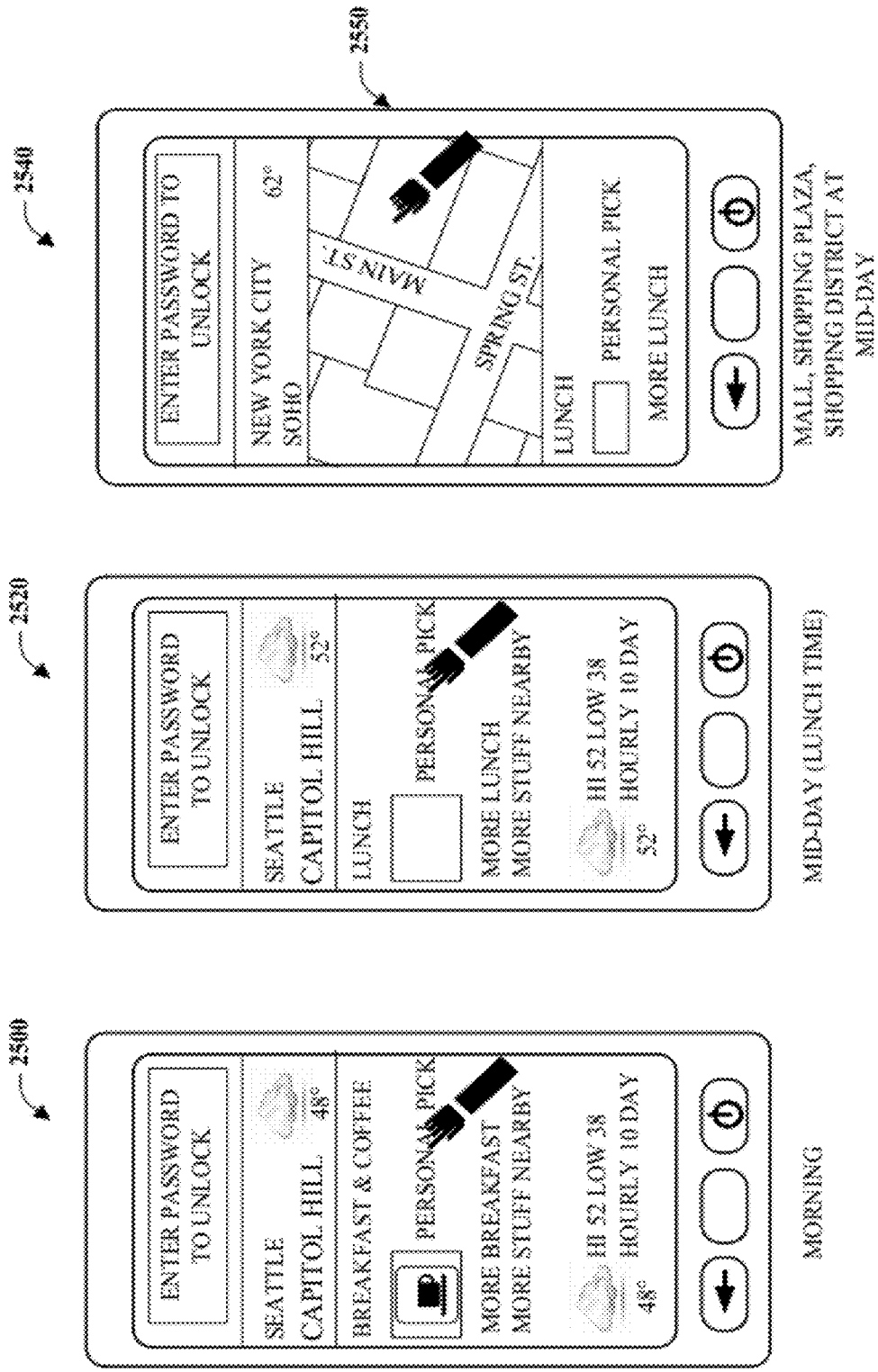

FIG. 25 illustrates three screenshots, 2500, 2520, and 2540, showing the effect of context with respect to a display of content above a lock screen. Screenshot 2500 illustrates content as displayed in the morning for a user including a suggested local restaurant for breakfast and coffee. Screenshot 2520 provides similar information but during mid-day (e.g., lunch time), which results in an alternate restaurant corresponding to lunch. Screenshot 1640 can also be presented at lunchtime, but when the user is in a mall or shopping district, a map 2550 can also be provided as shown, wherein the map corresponds to such mall or shopping district. It is to be appreciated that the map 2550 can be a mini-map of a particular location (e.g., mall mini-map illustrating location of shops, arena mini-map depicting seating/shops, shopping plaza or district depicting stores, etc.).

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 26:
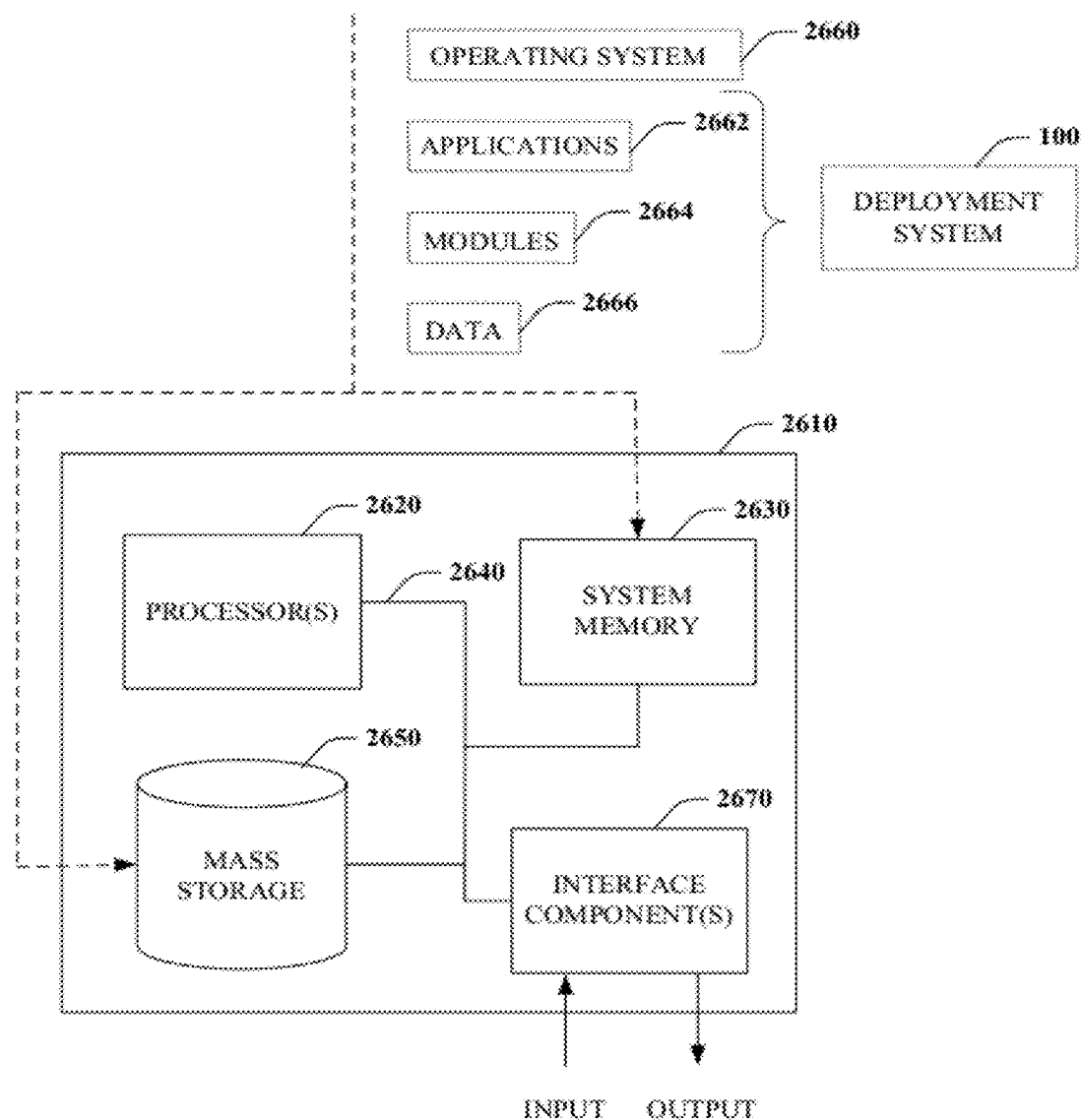
FIG. 26 is a schematic block diagram illustrating a suitable operating environment for aspects of the subject disclosure.

In order to provide a context for the claimed subject matter, FIG. 26 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 26, illustrated is an example general-purpose computer 2610 or computing device (e.g., desktop, laptop, server, hand-held, programmable consumer or industrial electronics, set-top box, game system . . . ). The computer 2610 includes one or more processor(s) 2620, memory 2630, system bus 2640, mass storage 2650, and one or more interface components 2670. The system bus 2640 communicatively couples at least the above system components. However, it is to be appreciated that in its simplest form the computer 2610 can include one or more processors 2620 coupled to memory 2630 that execute various computer executable actions, instructions, and or components stored in memory 2630.

The processor(s) 2620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 2620 may also be implemented as a combination of computing devices, for example a combination of a DSP and a microprocessor, a plurality of microprocessors, multi-core processors, one or more microprocessors in conjunction with a DSP core, or any other such configuration.

The computer 2610 can include or otherwise interact with a variety of computer-readable media to facilitate control of the computer 2610 to implement one or more aspects of the claimed subject matter. The computer-readable media can be any available media that can be accessed by the computer 2610 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 2610.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2630 and mass storage 2650 are examples of computer-readable storage media. Depending on the exact configuration and type of computing device, memory 2630 may be volatile (e.g., RAM), non-volatile (e.g., ROM, flash memory . . . ) or some combination of the two. By way of example, the basic input/output system (BIOS), including basic routines to transfer information between elements within the computer 2610, such as during start-up, can be stored in nonvolatile memory, while volatile memory can act as external cache memory to facilitate processing by the processor(s) 2620, among other things.

Mass storage 2650 includes removable/non-removable, volatile/non-volatile computer storage media for storage of large amounts of data relative to the memory 2630. For example, mass storage 2650 includes, but is not limited to, one or more devices such as a magnetic or optical disk drive, floppy disk drive, flash memory, solid-state drive, or memory stick.

Memory 2630 and mass storage 2650 can include, or have stored therein, operating system 2660, one or more applications 2662, one or more program modules 2664, and data 2666. The operating system 2660 acts to control and allocate resources of the computer 2610. Applications 2662 include one or both of system and application software and can exploit management of resources by the operating system 2660 through program modules 2664 and data 2666 stored in memory 2630 and/or mass storage 2650 to perform one or more actions. Accordingly, applications 2662 can turn a general-purpose computer 2610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the deployment system 100, or portions thereof, can be, or form part, of an application 2662, and include one or more modules 2664 and data 2666 stored in memory and/or mass storage 2650 whose functionality can be realized when executed by one or more processor(s) 2620.

In accordance with one particular embodiment, the processor(s) 2620 can correspond to a system on a chip (SOC) or like architecture including, or in other words integrating, both hardware and software on a single integrated circuit substrate. Here, the processor(s) 2620 can include one or more processors as well as memory at least similar to processor(s) 2620 and memory 2630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the deployment system 100 and/or associated functionality can be embedded within hardware in a SOC architecture.

The computer 2610 also includes one or more interface components 2670 that are communicatively coupled to the system bus 2640 and facilitate interaction with the computer 2610. By way of example, the interface component 2670 can be a port (e.g., serial, parallel, PCMCIA, USB, FireWire . . . ) or an interface card (e.g., sound, video . . . ) or the like. In one example implementation, the interface component 2670 can be embodied as a user input/output interface to enable a user to enter commands and information into the computer 2610 through one or more input devices (e.g., pointing device such as a mouse, trackball, stylus, touch pad, keyboard, microphone, joystick, game pad, satellite dish, scanner, camera, other computer . . . ). In another example implementation, the interface component 2670 can be embodied as an output peripheral interface to supply output to displays (e.g., CRT, LCD, plasma . . . ), speakers, printers, and/or other computers, among other things. Still further yet, the interface component 2670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
deploying at least a portion of a select application on a computer such that at least a subset of functionality of the select application is configured to execute while the computer is in a locked state;
while the computer is in the lock state, receive a query through an search interface displayed on a lock screen;
generating modified search results from a plurality of search results that are responsive to the query by preventing display of a search result from the plurality of search results by the at least subset of functionality of the select application in the locked state based on a privacy policy that specifies at least one of acceptable or unacceptable public data exposure without user authentication such that data that violates the privacy policy is withheld from exposure in the locked state; and
outputting for display above the lock screen, the modified search results.

2. The method of claim 1 further comprising outputting for display on the lock screen a slide-to-search interface control that causes the search interface to be displayed on the lock screen in response to a user sliding a finger over the slide-to-search interface.

3. The method of claim 1, wherein the search interface is a voice interface.

4. The method of claim 1, wherein the search interface is an image interface using a camera on the computing device.

5. The method of claim 1, wherein the modified search results provide contextual information based on location data for the computing device.

6. The method of claim 1, wherein the modified search results provide flight information.

7. The method of claim 1 further comprises transitioning to an unlocked state to execute an additional subset of functionality of the select application.

8. The method of claim 1, wherein the at least the portion of the select application relates to a social network application.

9. A computing system, comprising:
a processor; and
computer storage memory having computer-executable instructions stored thereon which, when executed by the processor, configure the computing system to:
execute search functionality while a device is in a locked state;
receive a query while the device is in the locked state through a search interface presented above the lock screen, and
manage exposure of data by the search functionality based on a privacy policy that specifies at least one of acceptable or unacceptable public data exposure without user authentication such that data that violates the privacy policy is withheld from exposure in the locked state.

10. The system of claim 9, wherein the computing system further configured to output for display on the lock screen a slide-to-search interface control that causes the search interface to be displayed on the lock screen in response to a user sliding a finger over the slide-to-search interface.

11. The system of claim 9, wherein the computing system further configured to deliver at least one search result for the query while the device is in the locked state.

12. The system of claim 9, wherein the query is at least one of a voice input or an image input.

13. The system of claim 9, the computing system further configured to provision content to the device based on context while in the locked state.

14. The system of claim 9, the computing system further configured to request an authentication to expose additional features associated with the search functionality.

15. The system of claim 14, wherein the authentication is requested to access a web page link associated with a selected search result provided by the search functionality.

16. A computer-readable device having instructions stored thereon that when executed cause a computing device to perform a method, the method comprising:
executing at least a portion of a select application on a computer such that at least a subset of functionality of the application is configured to execute while the computer is in a locked state;
while the computer is in the lock state, receive a query through an search interface displayed on a lock screen;
generating modified search results from a plurality of search results that are responsive to the query by preventing display of a search result from the plurality of search results by the at least subset of functionality of the select application in the locked state based on a privacy policy that specifies at least one of acceptable or unacceptable public data exposure without user authentication such that data that violates the privacy policy is withheld from exposure in the locked state; and outputting for display above the lock screen, the modified search results.

17. The computer-readable device of claim 16, wherein at least the portion of the select application is a search application.

18. The method of claim 1 further comprising generating an anonymous version of the data by removing personal information and exposing the anonymous version of the data.

19. The method of claim 1, wherein the method further comprises invoking user authentication to transition to an unlocked state after detecting data that violates the privacy policy.

20. The computer-readable device of claim 16, wherein the method further comprises generating an anonymous version of the data by removing personal information and exposing the anonymous version of the data.

21. The method of claim 1, wherein the privacy policy is specified by the user.

22. The system of claim 9, wherein the privacy policy is defined by a user of the device.

* * * * *